United States Patent
Kagami et al.

(10) Patent No.: US 6,831,809 B2
(45) Date of Patent: Dec. 14, 2004

(54) ROTARY RECORDING APPARATUS AND METHOD OF CONTROLLING THE APPARATUS

(75) Inventors: Naoyuki Kagami, Fujisawa (JP); Kenji Okada, Yokohama (JP); Tetsuo Semba, Zama (JP); Akira Tokizono, Fujisawa (JP); Hiroshi Uchida, Yamato (JP); Akinori Yuba, Fujisawa (JP)

(73) Assignee: International Business Machines Corporation, Armonk, NY (US)

(*) Notice: Subject to any disclaimer, the term of this patent is extended or adjusted under 35 U.S.C. 154(b) by 312 days.

(21) Appl. No.: 10/086,204

(22) Filed: Feb. 27, 2002

(65) Prior Publication Data

US 2002/0159187 A1 Oct. 31, 2002

(30) Foreign Application Priority Data

Feb. 27, 2001 (JP) .......................................... 2001-053226

(51) Int. Cl.$^7$ ............................................. G11B 5/596
(52) U.S. Cl. ................................ 360/78.09; 360/78.06; 360/78.07; 318/561
(58) Field of Search ................................ 360/75, 78.04, 360/78.06, 78.09, 78.07, 77.02; 318/561

(56) References Cited

U.S. PATENT DOCUMENTS

| | | | |
|---|---|---|---|
| 4,916,635 A | 4/1990 | Singer et al. ................ 364/513 |
| 5,469,414 A | 11/1995 | Okamura ..................... 369/32 |
| 5,638,267 A | 6/1997 | Singhose et al. ........... 364/148 |
| 5,859,742 A | 1/1999 | Takaishi ................... 360/78.01 |
| 6,031,684 A | 2/2000 | Gregg ..................... 360/78.06 |
| 6,636,377 B1 * | 10/2003 | Yu et al. ................... 360/78.07 |

FOREIGN PATENT DOCUMENTS

| JP | 9-139032 | 5/1997 | .......... G11B/21/08 |
|---|---|---|---|
| JP | 10-312655 | 11/1998 | .......... G11B/21/08 |
| JP | 2000-123502 | 4/2000 | .......... G11B/21/08 |

* cited by examiner

*Primary Examiner*—Andrew L. Sniezek
(74) *Attorney, Agent, or Firm*—Ronald B. Feece

(57) ABSTRACT

A control arrangement having a feedforward system and a feedback system, a control model for generating reference position data from a feedforward control signal is separated into an original control model and a compensation filter. Gain of the feedforward control signal is compensated by a gain compensation circuit to form a feedforward control signal after compensation. The reference position data is input to a feedback controller, and a feedback control signal and feedforward control signal are input to a control object. Coefficients of the compensation filter and the gain compensation circuit are compensated on the basis of a head position trajectory obtained by actual seek operation.

19 Claims, 15 Drawing Sheets

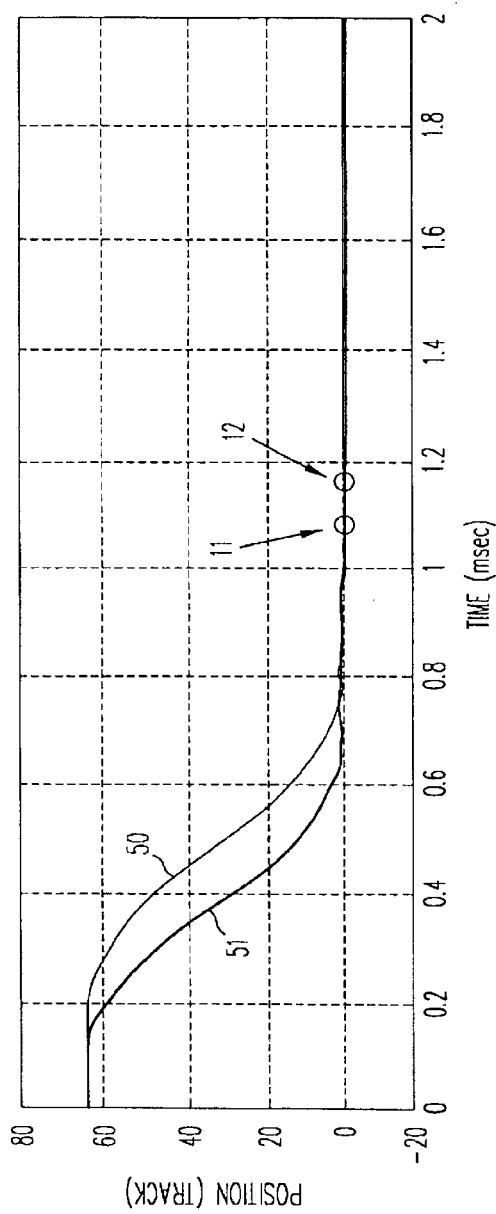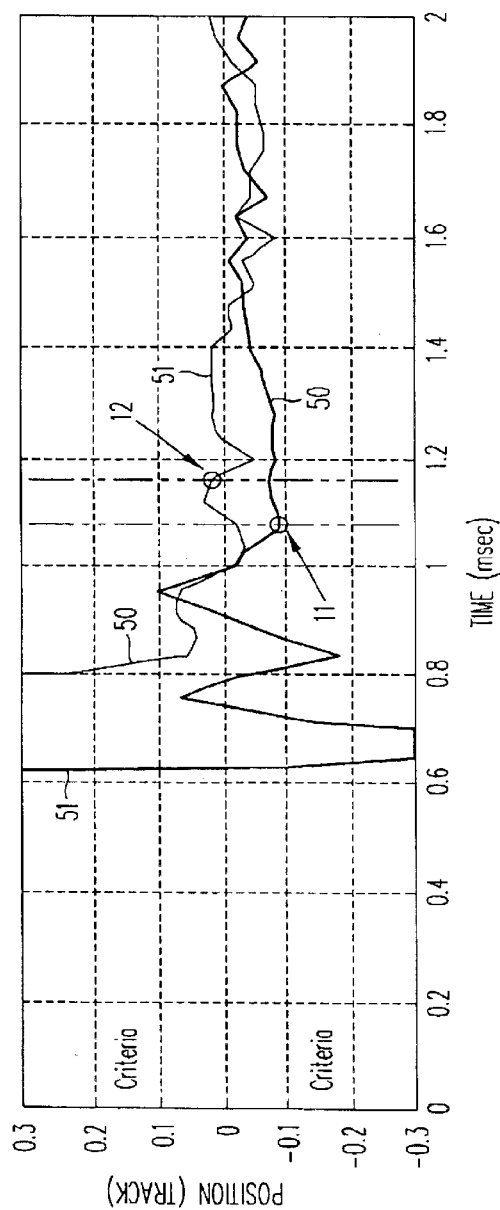

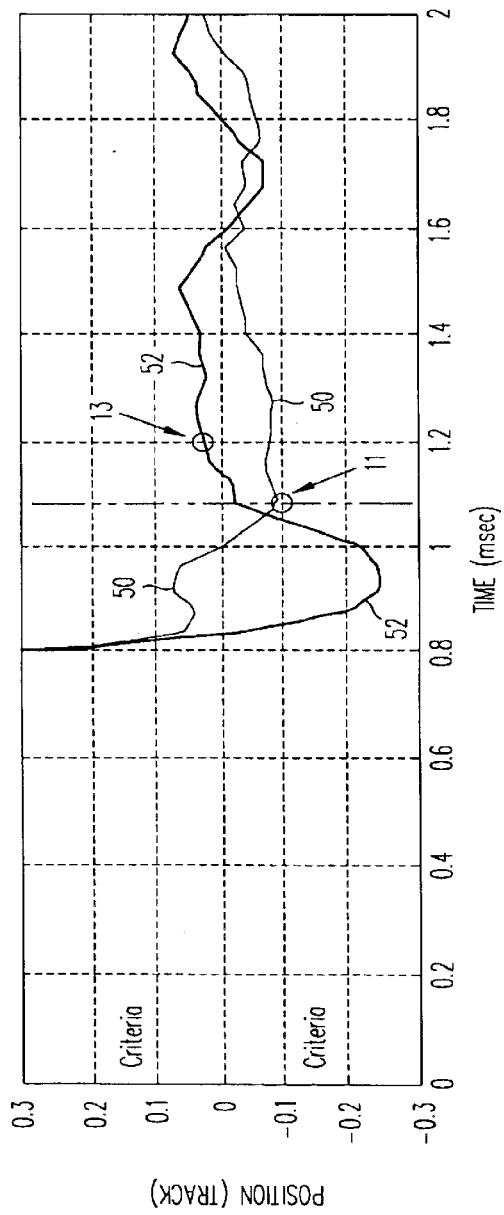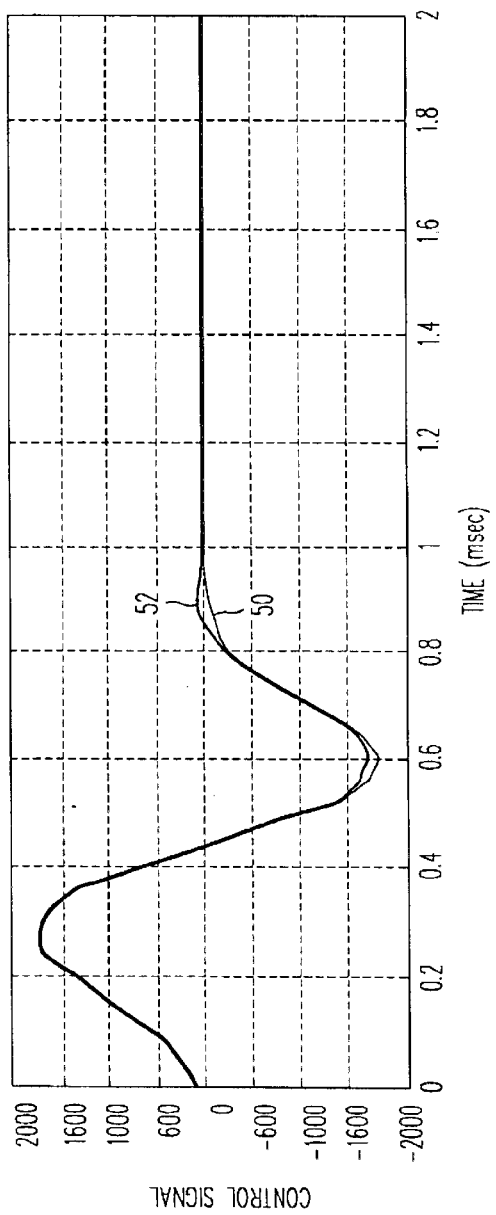

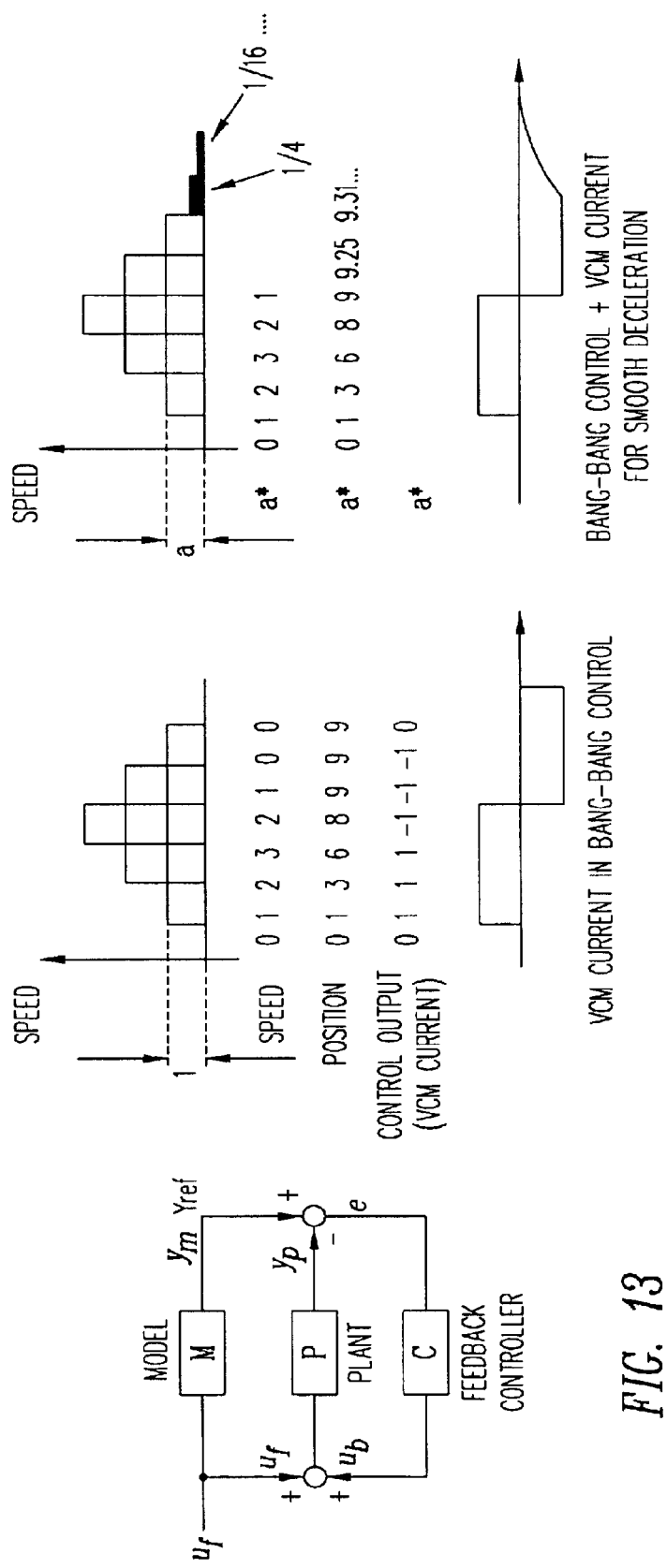

ROTARY RECORDING APPARATUS AND METHOD OF CONTROLLING THE APPARATUS

BACKGROUND OF THE INVENTION

1. Field of the invention

The present invention relates to a rotary recording apparatus such as a hard disk drive (hereinafter referred to as "HDD") and to a method of controlling the apparatus. More particularly, the present invention relates to a technique effectively used to improve the head seek performance of a model following control system used for head position control in HDDs.

2. Background of the Invention

As a method of controlling the position of a head in a rotary recording apparatus such as an HDD, one-degree-of-freedom control methods using only feedback control and two-degree-of-freedom control methods in which a feedforward signal is added to a feedback signal are known. In two-degree-of-freedom control, a step response characteristic (seek performance) is achieved chiefly by means of a feedforward signal while a disturbance response characteristic (following performance) is achieved chiefly by means of a feedback signal. The two characteristics can therefore be optimized separately from each other to improve the control performance or response performance. For this reason, there are now an increasing number of cases of adopting two-degree-of-freedom control methods for HDD head position control, of which a reduction in head seek time is strongly required. As two-degree-of-freedom control methods, target-trajectory-generation filter method, feedforward compensation method, model following method, (called model reference methods in some cases) and other various control methods are known.

A target-trajectory-generation filter control method is a method in which a target position of a feedback loop is changed by a feedforward signal each time sampling is made for a control signal (in a control cycle). This control method achieves head position control at a higher speed and in an improved manner because a target position is changed by a feed forward signal for each sample. This method, however, has the drawback that it is difficult to generate an optimum feedforward signal because the head response characteristics (seek operation characteristics) depend on the characteristics of the feedback loop as well as on the feedforward signal.

A feedforward compensation control method is a method of feeding forward an acceleration signal to a conventional speed control loop. For example, a target speed is differentiated at the time of deceleration to calculate a target acceleration, which is applied as a feedforward signal to the control loop. In this method, various techniques for optimizing the feedforward signal can be devised, for example, the gain set for the feedforward signal can be determined on the basis of an adaptive control rule or a learning rule. However, mode change from speed control to position control is required, which cannot be smoothly performed, and it is difficult to optimize a response characteristic of settling.

A model following control method is a method using a system which has generally an internal control model obtained by modeling a control object, which gives the object a control output and a target trajectory such that control of the model is optimized. That is, in model following control, the same control target is input to a control model and a control object (feedforward control). If the model is perfect, the control model and the control object output equal control values. Generally, however, other factors, i.e., a disturbance, etc., exist, which hinder convergence to the target trajectory. Therefore feedback to the control object is provided (feedback control), thereby enabling seek with the head and following of the head to be controlled separately by feedforward control and by feedback control, respectively.

The model following control method is free from the above-described drawbacks of the target-trajectory-generation filter control method and the feedforward compensation control method, and has the following advantages, which the other two methods lack. That is, if a control object and a control model are equivalent to each other in terms of control characteristics (that is, there is no modeling error), the control object can be controlled in an optimum fashion theoretically. Even if there is a modeling error, a steady-state error in head position caused by the modeling error can be eliminated by the feedback loop. Further, a step response characteristic (seek operation characteristic) can be determined without being influenced by the feedback loop. Enabling determination of a step response characteristic with no influence from the feedback loop is particularly advantageous in a case where, as in the case of an HDD, there is a need for a high-speed seek operation while suppressing vibration due to mechanical resonance in a high-frequency range associated with the seek operation. That is, the model following control method makes it easier to obtain a response characteristic realizing high-speed seek operation while suppressing mechanical vibration of the head. Theoretically, it enables optimization of HDD head control in this manner.

For example, a control model using a state estimator may be mentioned. A control method has been employed in which a position, a speed and a acceleration are estimated by state estimators and respectively combined with a feedforward signal.

As measures for compensating a non-coincidence (modeling error) between a control model and an actual control object, techniques described below are known. For example, in the specification of U.S. Pat. No. 6,031,684, a technique of determining a change in the gain of an actuator during seek operation and effecting asymptotic conversion of the gain to an optimum value is described. A method of compensating only a gain by calibration means is described in the specification of Published Unexamined Patent Application No. 10-312655. Also, techniques of storing variable factors other than gain as a feedforward signal in a table are described in the specifications of Published Unexamined Patent Application No. 9-139032 and U.S. Pat. No. 5,859,742.

A feedforward control output (feedforward signal) is given as a current value or a target acceleration of a voice coil motor (VCM), for example. To achieve faster step response, a feedforward signal preferably includes certain high-frequency components. Mechanical systems for head seek including an arm, etc., however, ordinarily have high-frequency resonance mode. If a signal which can resonate at the resonance frequency of such a mechanical system, corresponding mechanical vibration is increased, which results in an increase in seek time. Therefore there is a need to produce a control output having no resonance frequency. As a control output production means satisfying this requirement, techniques of limiting high-frequency components by using a sine function are disclosed in the specifications of U.S. Pat. No. 6,031,684 and Published Unexamined Patent Application No. 2000-123502. Also, methods of performing filtering on an input signal according to the natural frequency of mechanical vibration of a control object are disclosed in the specifications of U.S. Pat. Nos. 4,916,635 and 5,638,267. A technique of producing a feedforward signal by using a polynomial formed as a time function is disclosed in U.S. Pat. No. 5,469,414.

The inventors of the present invention recognized problems described below when the above-described model following control is applied to an actual HDD head positioning system.

First, there is a problem of a reduction in seek speed due to a modeling error. That is, while high-speed time response is required of the seek operation of HDDs, the feedback loop response currently achieved is not enough for following high-speed seek operation. The highest operating frequency of a feedback control system is generally determined by the zero cross frequency of the open loop. However, components exceeding this zero cross frequency exist in the frequency components of the seek operation of currently available systems. In general, there is a non-coincidence (modeling error) between a control model and an actual control object, and the modeling error results in an error of the controlled position of a head from a target position. An error due to a delay in the response of the feedback control system cannot be suppressed in a sufficiently short time, so that an error of the head position remains at the time of settling. The time required for the head to complete following a track (seek time) is thereby increased. A modeling error occurs necessarily since individual actuators vary in gain and phase or vary depending on operating environments, or for other reasons. To optimize control in the model following method, it is important in practice to consider the way in which a control model is identified and compensated.

Several known techniques may be used as a solution to this problem. For example, the above-mentioned techniques described in the specifications of U.S. Pat. No. 6,031,684, Published Unexamined Patent Application Nos. 10-312655 and 9-139032, and U.S. Pat. No. 5,859,742 may be used. Each of these techniques, however, lacks consideration of a complicated modeling error other than the gain of an actuator such as a phase delay, and is unsatisfactory in terms of a response characteristic at the time of settling.

Second, there is a problem relating to generation of feedforward signal which does not cause mechanical vibration. It is apparent that each of the techniques described in the specifications of U.S. Pat. No. 6,031,684, Published Unexamined Patent Application No. 2000-123502, and U.S. Pat. Nos. 4,916,635 and 5,638,267 is effective in limiting resonance of the seek mechanism. However, the techniques described in the specifications of U.S. Pat. No. 6,031,684 and Published Unexamined Patent Application No. 2000-123502 do not produce an optimum feedforward control output for high-speed seek operation in a case where vibration due to mechanical resonance is inherently small or there is a limit to the maximum VCM current value. This is because it is known that in an ideal case where there is no mechanical resonance, a seek operation based in so-called bang-bang control is theoretically highest in speed.

On the other hand, the techniques described in the specifications of U.S. Pat. Nos. 4,916,635 and 5,638,267 use a filter capable of attenuating only a resonance frequency, enable inclusion of high-frequency components in the signal, and are, therefore, probable to achieve a high-speed seek operation even if there is a limit to the maximum VCM current value. However, this method can be applied only to cases where the characteristics of a control object are known and the reverse characteristics can be obtained, and cannot be said to be always satisfactory in terms of robustness if the possibility of variation in resonance frequency depending on actual individual units is considered. That is, this method characterized by attenuating a signal component only at a particular frequency to avoid mechanical resonance does not ensure the desired performance in a case where an individual unit has a resonance frequency different from that corresponding to the predetermined filter characteristic.

Each of the above-described techniques relating generation of a feedforward signal entails the problem of an increase in the amount of calculation for generating the signal. In particular, in a case where state estimators are used in a control model, the influence of an increase in the amount of calculation is considerable. Calculation functions in an HDD comprise servo calculation for seek control and processing for executing commands from a host. Simplified HDDs recently provided are designed to achieve these calculation functions by using a single microprocessor unit (MPU). If the amount of calculation is increased as a result of adoption of complicated calculation means, there is a possibility of the amount of calculation exceeding the processing capacity of the single MPU to produce a contrary effect of reducing the performance of the HDD.

SUMMARY OF THE INVENTION

An object of the present invention is to provide a technique for reducing a modeling error inhering in a control model assumed in model following control, including gain and phase, to such a level as to ensure that the control system can operate with practically no problem relating to the error, in other words, a technique for identifying a practical simple control model and for compensating the model.

Another object of the present invention is to provide a technique for realizing a high-speed step response characteristic even if there is a limit to the maximum VCM current value, and for generating, by a small amount of calculation, a feedforward signal which causes substantially no high-frequency mechanical vibration.

Still another object of the present invention is to provide an HDD to which the above-mentioned practical control model, means for compensating the model, and feedforward signal are applied to reduce the seek time (a time period required to complete track following) or to improve a response performance.

The present invention will be summarized below. According to the present invention, there is provided a rotary recording apparatus comprising a rotary type recording medium on which information is recorded, a head for performing at least reading out information from the recording medium, head drive means for driving the head, head position detection means for outputting data on the current position of the head, and control means for controlling the position of the head relative to the recording medium. The control means includes feedforward control signal generation means for outputting a feedforward control signal in response to input of a target position of the head, a control model which outputs reference position data in response to input of the feedforward control signal, and a feedback controller which outputs a feedback control signal in response to input of the reference position data and negative feedback data. The control means controls the position of the head to be in the target position by inputting the feedback control signal and the feedforward control signal to the head drive means, by setting the negative feedback data to the current position data, and by inputting the difference between the reference position data and the negative feedback data (current position data) to the feedback controller. The control model is compensated so that, in a compensation process state in which compensation is made for an input to the feedback controller as a bias force, and in which the negative feedback is shut off, a sequence of the reference position data and a sequence of the current position data for each control cycle coincide with each other in response to input of the target position.

In the rotary recording apparatus of the present invention, the control model is compensated by being compared with a head position locus obtained by an actual seek operation. That is, an actual head position trajectory is measured to reduce a modeling error, thereby enabling the control model to be suitably matched to control objects varying for each unit. Therefore, the head position error at the time of settling in model-following feedforward control can be reduced to an extremely small value to shorten the seek time required to complete track following. In the present invention, no state estimator is used for the control model and each of the control signals is formed only from a position signal. That is, according to the present invention, speed control is not performed and only position control is performed. Therefore, the control system can be simplified and MPU resources can be effectively utilized. For example, a support logic of a hard disk controller, called servo assist, may be used to reduce the calculation load on the servo system, thus achieving servo control with a single MPU. Since the present invention uses only position control, no mode change from speed control to position control is made. There is no possibility of vibration in high-order mechanical vibration modes caused by a mode change. Therefore the settling time can be reduced.

The control means further includes gain compensation means for compensating the gain of the feedforward control signal. The feedforward control signal gain-compensated by the gain compensation means is input to the head drive means. The control model is formed by an original control model and a compensation filter. The control means also includes means for obtaining, for each control cycle, model position data output from the original control model in response to the target position input in the compensation process state, means for obtaining, for each control cycle, current position data output from the head position detection means in response to the target position input in the compensation process state, means for obtaining a filter to which a sequence of the model position data is input, and from which a sequence of the current position data is output, means for separating the filter into a filter having a DC gain of 1 and a remaining gain, and means for replacing a coefficient of the gain compensation means with a value obtained by dividing the current coefficient by the remaining gain, and for replacing the compensation filter with the filter having a DC gain of 1.

That is, the control model is separated into an original control model and a compensation filter, and gain compensation means for compensating the gain of the feedforward control signal is provided. This arrangement enables compensation of a complicated control model including phase as well as gain. According to the present invention, compensation of the DC gain is performed chiefly by the gain compensation means while compensation of the remaining gain and phase is performed by the compensation filter. According to this method of adjusting separated compensation functions, improved compensation effects can be ensured even if the compensation filter is simplified. Therefore, simpler compensation calculation may suffice.

As the above-described original control model, a rigid-body model which outputs, in response to input of the feedforward control signal, a value obtained by second-order integration can be used. Also, control signal data, etc., after the above-described compensation may be recorded in a table. During ordinary use, the data recorded in the table is read out to be used for control, thereby reducing the calculation load on the MPU.

The feedforward control signal can be obtained by generating a control signal sequence, such as that in bang-bang control output, which causes maximum acceleration and maximum deceleration in the head in response to input of the target position, and by passing the control signal sequence through a low-pass filter having a DC gain of 1. The cutoff frequency of the low-pass filter is set lower than the resonance frequency of the head drive means. A control signal for providing maximum acceleration and maximum deceleration is generated to improve a step response characteristic (seek performance) of the head seek. On the other hand, high-frequency components which cause mechanical vibration of the head drive system can be removed by the low-pass filter to suppers mechanical vibration of the head drive system, so that the settling time and, hence, the seek time can be reduced. That is, the present invention makes it possible to form a control signal capable of rapid response as well as suppressing mechanical vibration.

The control signal sequence in a state of decelerating the head can be formed so as to change smoothly during its attenuation. That is, at a final stage of a response to the target trajectory at which the position of the head is converging to the target position, the force of driving the head is reduced to suppress overshooting beyond the head target position, thereby advancing reducing the settling time the settling time.

Also, in the present invention, the gain of the control model can be compensated according to a change in the gain of the head drive means. More specifically, the square of the feedforward control signal and the product of the feedforward control signal and the feedback control signal are computed in each of control cycles during ordinary seek operation; a cumulative value of each of the square and the product is obtained from the start to the end of the seek operation; the cumulative value of the product is divided by the cumulative value of the square; and the gain of the control model compensated with the value obtained by the division.

The gain is thus compensated to be an optimum value at all times to compensate the difference between the real system and the model system (modeling error) due to a change in operating environment conditions or a change in the disk position. In actuality, the gain of the control object is, for example, the gain of a voice coil motor (VCM), which varies depending on the operating environment and the seek position on the disk. On the other hand, variation in phase of the head drive system due to a change in operating environment conditions or a change in disk position is not considerably large. Therefore, from the viewpoint of these characteristics of a hard disk unit, the present invention comprising adjusting on the gain during use of the disk after the above-described compensation of the control model is considered to be a simpler and high-performance control means suitable for disk units. The above-described gain compensation during use of the disk can be applied to the above-described compensation of the gain of the feedforward control signal performed by the gain compensation means.

In the above-described control means, the control signals (feedforward control signal and feedback control signal) can be input to the control object through a digital filter. The transfer characteristics of this digital filter may be adjusted to enable the control model to be formed more finely. This filter also enables simplification of the above-described compensation filter and is effective in reducing a modeling error over the entire range of seek length.

The above-described rotary recording apparatus of the present invention can also be recognized as a method for realizing its functions in accordance with the present invention.

BRIEF DESCRIPTION OF THE FIGURES

FIG. 13 is a block diagram of a model-following control system;

FIG. 16 is a diagram showing another method of forming a control signal.

DETAILED DESCRIPTION OF THE PREFERRED EMBODIMENTS

Figure 1:
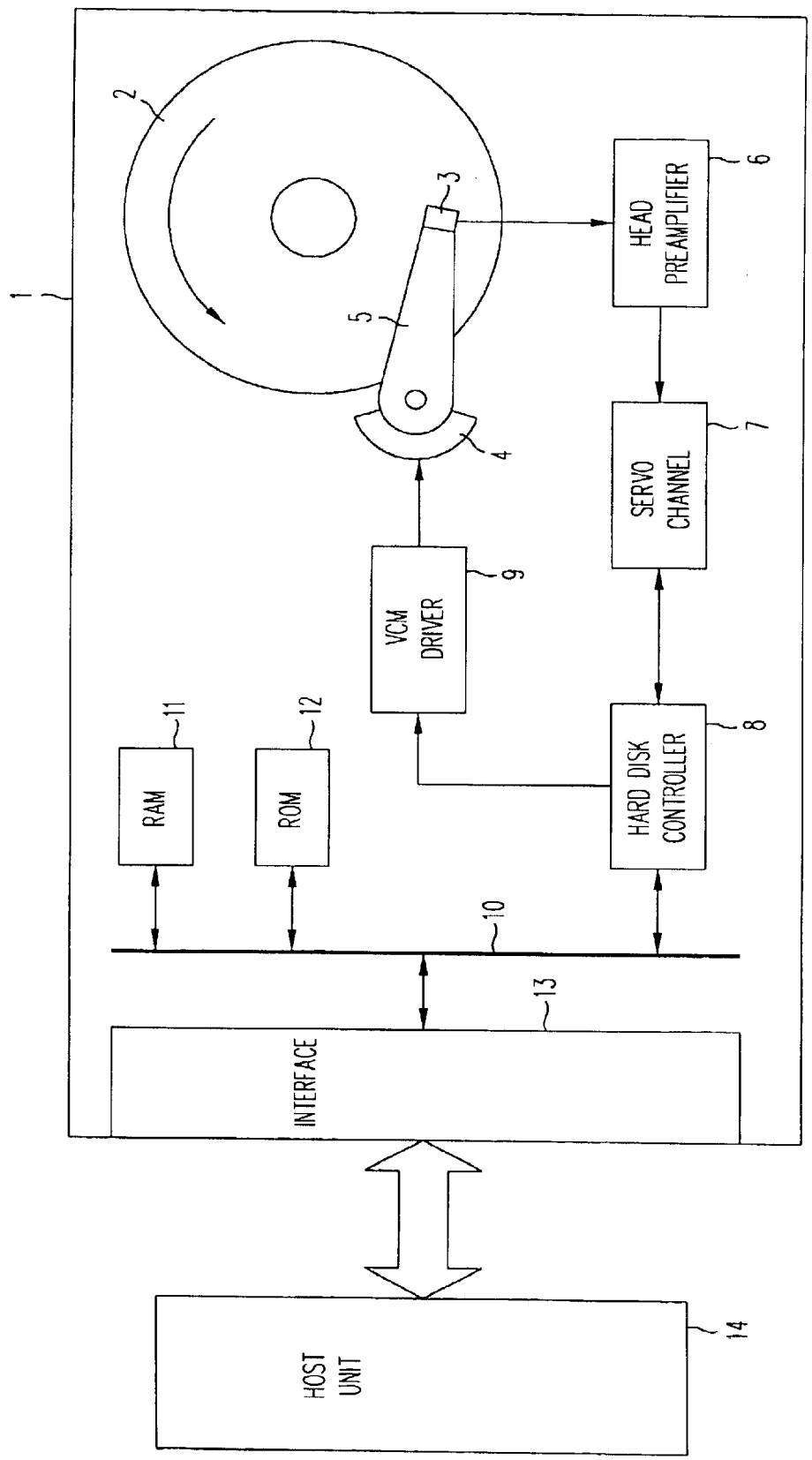
FIG. 1 is a block diagram showing an example of a hard disk unit which represents an embodiment of the present invention.

Embodiments of the present invention will be described below in detail with reference to the accompanying drawings. The present invention can be implemented variously and embodiments thereof should not be construed as limiting the invention. Identical or corresponding components of the embodiments are indicated by the same reference numerals throughout the description of the embodiments.

FIG. 1 is a block diagram showing an example of a hard disk unit which represents an embodiment of the present invention. The hard disk unit 1 of this embodiment is constituted by a magnetic recording medium 2, a head 3, a voice coil motor (VCM) 4, an arm 5, a head preamplifier 6, a servo channel 7, a hard disk controller 8, a VCM driver 9, a bus 10, a random access memory (RAM) 11, a read only memory (ROM) 12, and an interface 13.

The magnetic recording medium 2 is a disklike recording medium on which information is magnetically recorded. For example, the magnetic recording medium 2 is driven by a spindle motor to rotate. Position information is recorded in advance at positions radially ordered on the magnetic recording medium 2.

The head 3 has the functions of magnetically recording information on the magnetic recording medium 2 and reading out information recorded on the magnetic recording medium 2. The head 3 converts magnetic information into an electric signal by utilizing a giant magnetoresistive (GMR) effect, for example.

The VCM 4 drives the arm 5 by current drive to move the head 3 mounted on an end of the arm 5 along a diametral direction of the magnetic recording medium 2. The VCM 4 and the arm 5 constitute an actuator.

The head preamplifier 6 amplifies an analog signal from the head 3 and supplies the amplified signal to the servo channel 7. The analog signal is amplified to a constant level by automatic gain control.

The hard disk controller 8 performs overall control of the disk unit. For example, the hard disk controller 8 is supplied with a servo signal from the servo channel 7 and outputs a head control signal to the VCM driver 9.

The VCM driver 9 receives the head control signal from the hard disk controller 8 and generates a drive current for driving the VCM 4. There is a limit to the maximum of the drive current in ordinary VCM systems in relation to the power supply capacity. Also in the VCM driver 9 of this embodiment, there is a limit to the maximum current.

The hard disk controller 8 is connected by the bus 10 to the RAM 11, to the ROM 12 and to the interface 13. The interface 13 interfaces with a host unit 14. The ROM 12 stores a program executed by an MPU in the hard disk controller 8. The RAM 11 is loaded with, for example, the program stored in the ROM 12. The RAM 11 may function as a buffer for buffering data supplied to or from the host unit 14.

Figure 2:
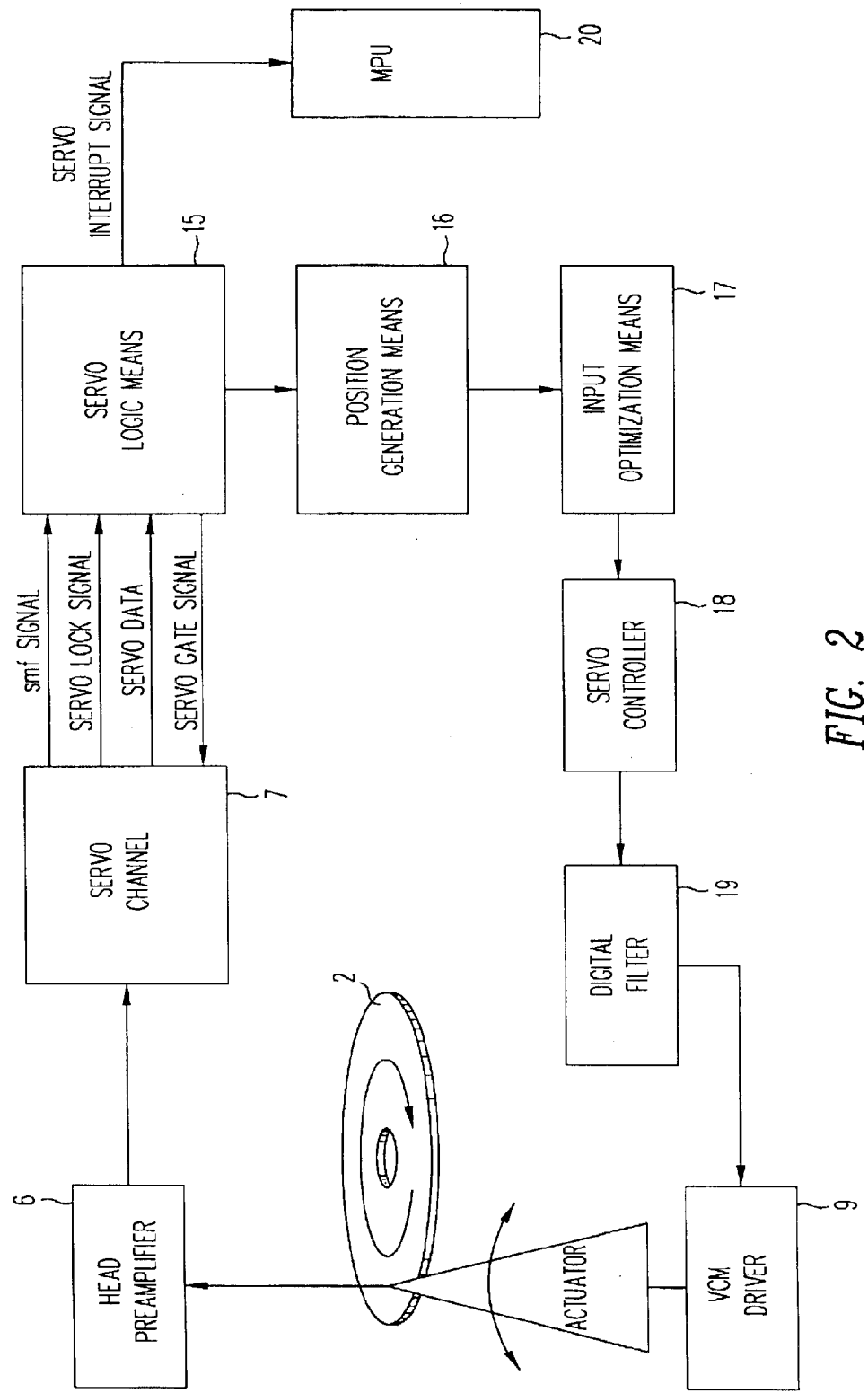
FIG. 2 is a block diagram showing details of a hard disk controller and components around the controller in the hard disk unit shown in FIG. 1.

FIG. 2 is a block diagram showing details of the hard disk controller 8 and the components provided around the controller 8. The hard disk unit comprises components or means described below as well as those described above. That is, a servo logic means 15, a position generation means 16, an input optimization means 17, a servo controller 18, a digital filter 19, and a MPU 20 are provided. A plurality of components or means including these are formed in a one-chip device in the hard disk controller 8. However, these components may alternatively be formed as discrete devices.

On the magnetic recording medium 2, position information is recorded in advance at radially ordered positions, as described above. The position information comprises servo address marks (SAM), Gray code, and bursts. Data on the medium 2 including the position information is read out with the head, amplified by the head preamplifier 6, and input to the servo channel 7.

The servo channel 7 detects SAMs from the analog waveform from the head preamplifier 6. Each time it detects a SAM, it immediately sends a servo-address-mark-found (smf) signal to the servo logic means 15. The servo channel 7 also decodes Gray code following the SAM and makes A/D conversion of a burst signal. These kinds of data are sent to the servo logic means 15 by serial transmission via a servo data line. The servo channel 7 is activated by a servo gate signal.

The servo logic means 15 performs timing control for activating the servo channel 7 to read a servo pattern (position information) written on the medium 2 at designed sampling intervals (control cycles). The servo logic means 15 transfers to the position generation means 16 information obtained from the servo channel 7. At the time when the servo logic means 15 obtain position information, it causes a servo interrupt on the MPU 20. Simultaneously, it generates a servo lock status. The servo logic means 15 may have the function of monitoring the state of detection of SAMs in the servo channel and generating a dummy SAM if no SAM is detected in a predetermined time window. This dummy SAM generation makes it possible to periodically cause servo interrupts on the MPU 20 with reliability even if SAM detection failure occurs for some reason.

The position generation means 16 generates a current position from a servo pattern. This generation of position information may alternatively be performed by the servo logic means 15. The position generation means 16 also calculates position error information necessary for feedback control on the basis of the generated current position and a target position.

The input optimization means 17 has the function of checking information output from the position generation means 16 and preventing the servo controller 18 from producing discontinuous outputs. The functions of the input optimization means 17 may be realized by the position generation means 16 or the servo controller 18.

The servo controller 18 incorporates feedback and feedforward parameters optimized so as to minimize the seek time. Feedforward control is performed by using a control model, as described below in detail. The servo controller 18 calculates a VCM output each time sampling is made (servo interrupt control). The servo controller 18 will be described below in more detail.

As digital filter 19, a notch filter for reducing resonance vibration of the mechanical system may be provided. Also, a filter for simplifying the control model is provided, as described below.

The MPU 20 performs various kinds of control in accordance with microcodes recorded on the RAM 11 or ROM 12. In this embodiment, the MPU 20 has, as a particularly important control function, the function of performing servo control in response to an interrupt signal from the servo logic.

Figure 3:
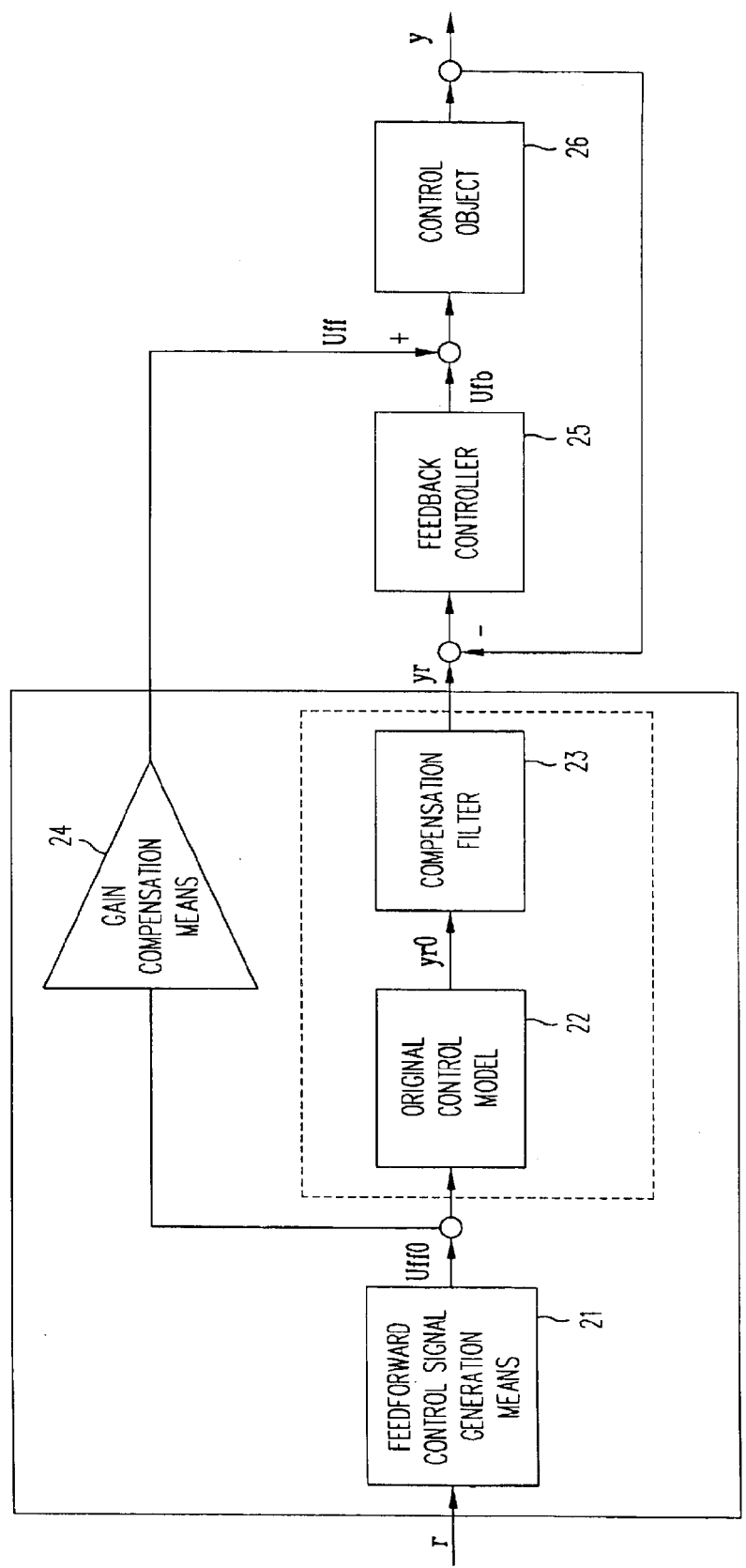
FIG. 3 is a block diagram showing a control system realized by the servo controller.

FIG. 3 is a block diagram showing a control system formed by the servo controller 18. The control system of this embodiment comprises a feedforward system including a feedforward control signal generation means 21, an original control model 22, a compensation filter 23, and a gain compensation means 24, and a feedback system in which an output from a feedback controller 25 is input to a control object 26, and the difference between current position data y and reference position signal yr is input to the feedback controller 25. The control-object 26 includes the entire drive system and the entire of current position acquisition means (measuring system) relating to head positioning. The head 3, the head preamplifier 6, the servo channel 7, the servo logic means 15, the position generation means 16, the input optimization means 17, the VCM driver 9, the actuator (VCM 4) are included in the control object.

The feedforward control signal generation means 21 outputs a feedforward control signal Uff0 in response to input of a target position r. Feedforward control signal Uff0 is gain-compensated by the gain compensation means 24. The gain compensation means 24 outputs a signal Uff as a gain-compensated feedforward control signal. Signal Uff constitutes the input to the control object 26. On the other hand, feedforward control signal Uff0 is input to the original control model 22 to generate a model position signal yr0. Signal yr0 is input to the compensation filter 23 to output reference position signal yr. Reference position signal yr, obtained as an input to the feedback system, is input to the feedback controller 25. Simultaneously, a negative input fed back from output of the control object 26 (current position data y) is input to the feedback controller 25. The feedback controller 25 generates a feedback control signal Ufb, which constitutes the input to the control object 26.

That is, feedforward control signal Uff generated in the feedforward system and feedback control signal Ufb are input as a control signal to the control object 26. The current position is fed back to form a negative input which is input to the feedback system together with reference position signal yr. In this control system, if the transfer function of the control model formed by the original control model 22 and the compensation filter 23 and the transfer function of the control object 26 are identical to each other (assuming that the gain coefficient of the gain compensation means 24 is 1), reference position data yr and current position data y are equal to each other. This is the same as the result of control by the feedback control system of an error due to a disturbance. In actuality, however, the transfer function of the control model and the transfer function of the control object are not equal to each other and there is a modeling error. The control means in this embodiment compensates the difference between these transfer functions by the compensation filer 23 and the gain compensation means 24. That is, in this embodiment, the control model is separated into the original model 22 and the compensation filter 23, a gain portion of the modeling error is compensated by the gain compensation means 24 while the other portion is compensated by the compensation filter 23.

This arrangement enables a simple model such as a rigid-body model to be used as original control model 22. In general, in the case of a hard disk unit, a delay occurs relative to a rigid-body model. Therefore a low-order low-pass filter may be adequate as compensation filter 23. Further, compensation in control means 24 is performed by only changing the gain coefficient. Therefore, the calculation of the control signal in the feedforward system is simple. Moreover, the values of Uff and yr are determined according to a seek distance and can be calculated in advance (one sampling period before). For these reasons, the calculation time in this embodiment is not substantially increased relative to that in the control system in which only feedback control is performed.

The method of compensating a modeling error in the thus-arranged control system will now be described.

Figure 4:
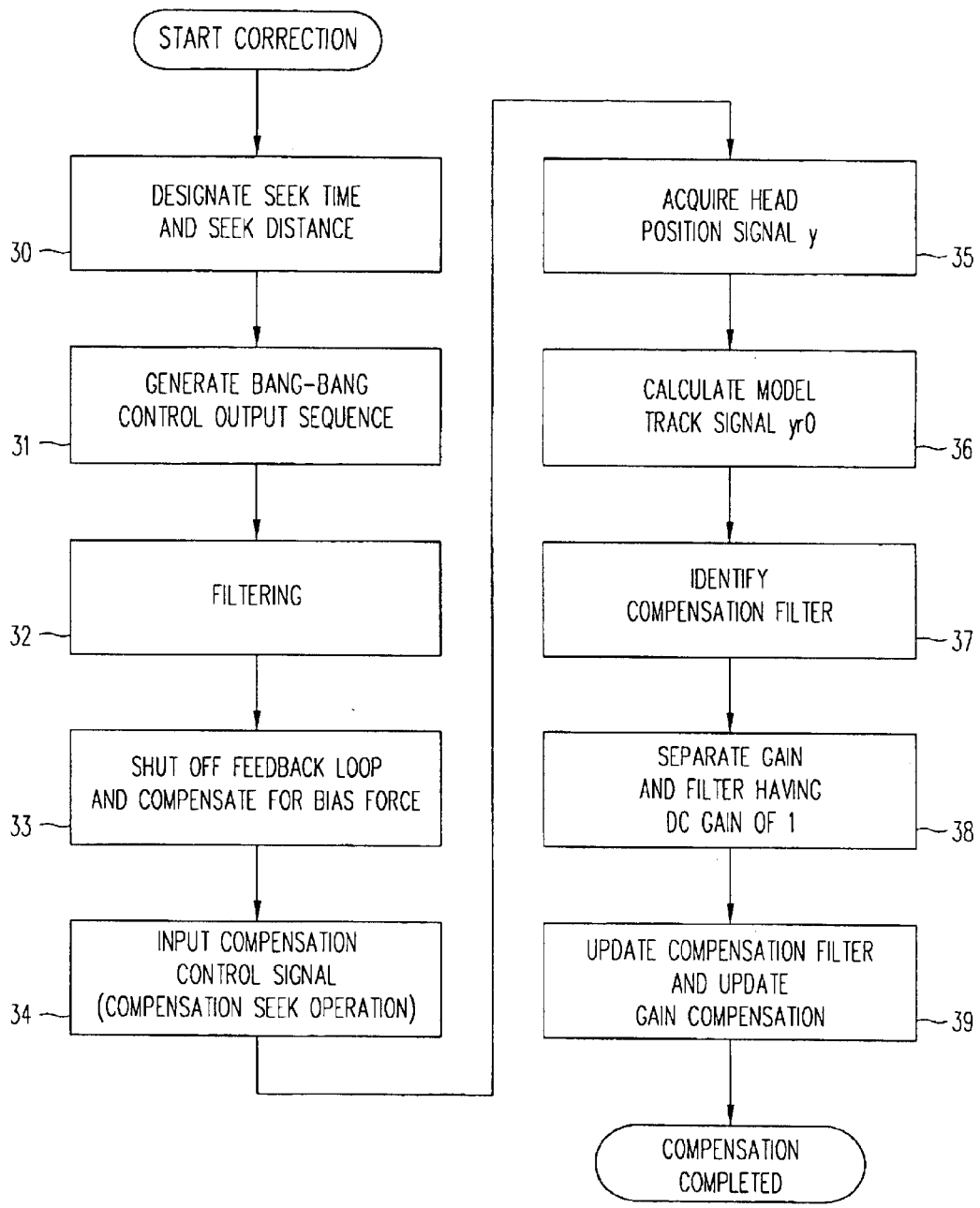
FIG. 4 is a flowchart showing an example of processing for compensating a modeling error in the embodiment of the present invention.

FIG. 4 is a flowchart showing an example of processing for compensating a modeling error in this embodiment.

First, a feedforward control output is produced to perform a high-speed seek operation while reducing vibration due to mechanical resonance in a high-frequency range accompanying the seek operation. The method of generating a feedforward control output described below is effective as long as the VCM current is not saturated.

First, a seek distance Y and a seek time (sampling cycles) T are designated (step 30). A control output sequence of bang-bang control for seeking through seek distance Y for seek time T is then generated (step 31). The control object is assumed to be a rigid-body model. The control output sequence generated in step 31 is filtered by using a low-pass filter having a DC gain of 1 (i.e., 0 dB) (step 32), thereby forming a control output sequence in which occurrence of high-frequency components is limited.

Figure 5:
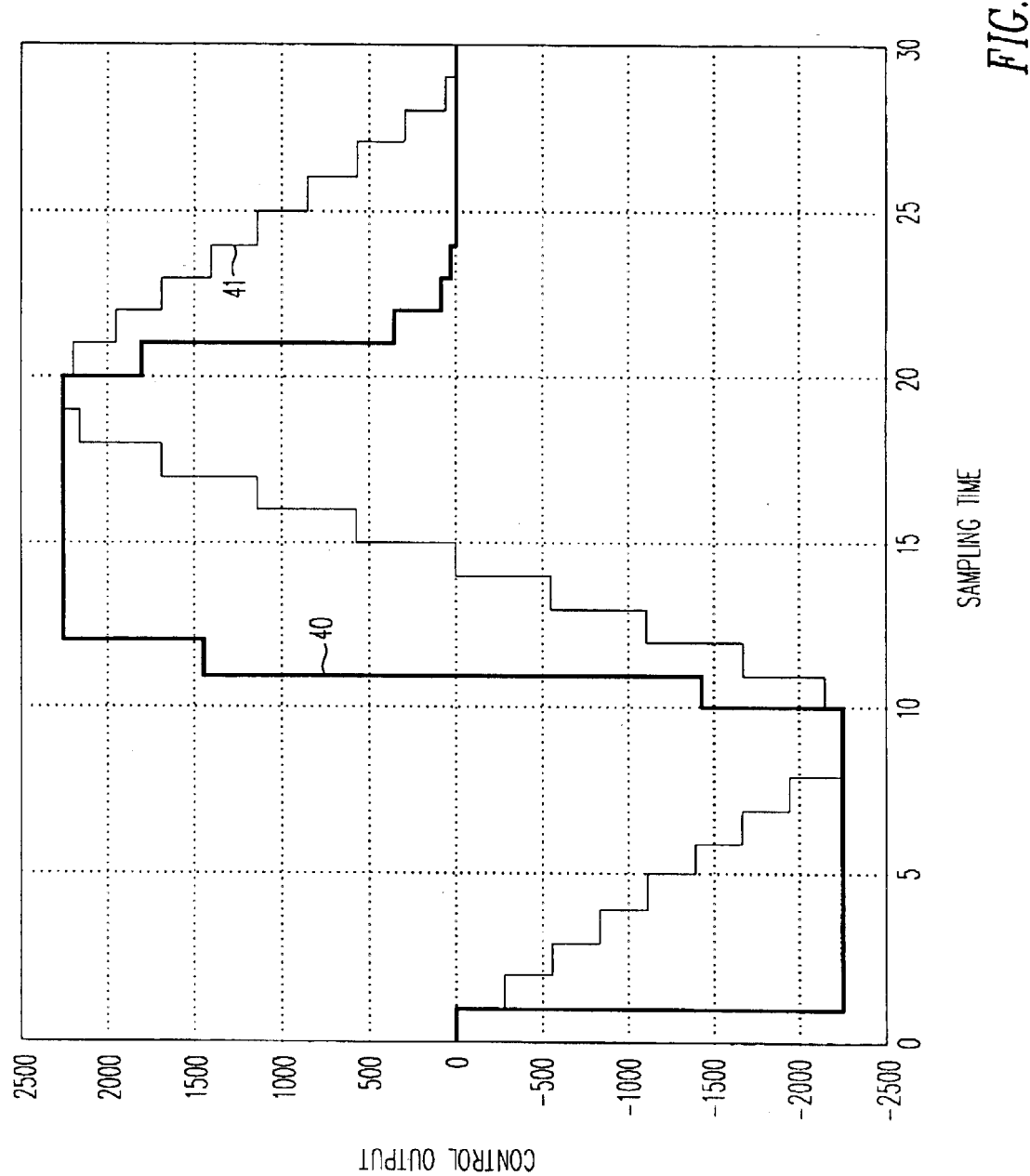
FIG. 5 is a diagram showing an example of filtering of a control output sequence of bang-bang control with an 8th-order filter to form a control output sequence in which high-frequency components are reduced.
Figure 6:
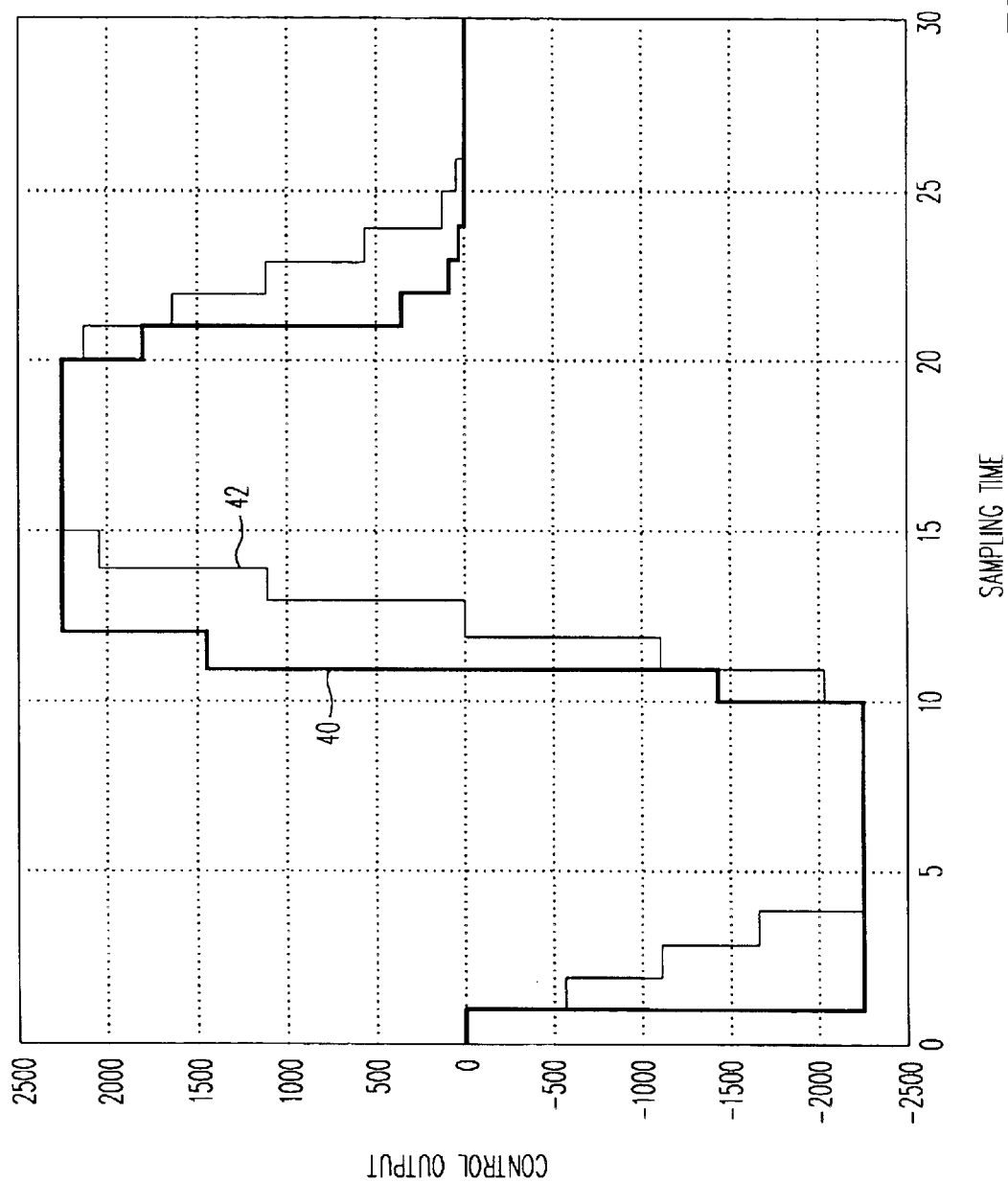
FIG. 6 is a diagram showing an example of filtering of a control output sequence of bang-bang control with a 4th-order filter to form a control output sequence in which high-frequency components are reduced.

FIG. 5 is a graph showing an example of the result of filtering a control output sequence of bang-bang-control with an 8th-order filter to form a control output sequence in which high-frequency components are reduced. A line 40 indicates a control output sequence of bang-bang-control, and a line 41 indicates a control output sequence after filtering. A low-pass filter expressed by an equation sys_FIR=$(z^8+z^7+z^6+z^5+z^4+z^3+z^2+z^1)/(8 \times z^8)$ is used to filter the output control sequence. A term $z^-$ represents a one-control-cycle delay factor. FIG. 6 is a graph showing another example of the result of filtering a control output sequence of bang-bang-control with a 4th-order filter to form a control output sequence in which high-frequency components are reduced. A line 40 indicates a control output sequence of bang-bang-control, and a line 42 indicates a control output sequence after filtering. A low-pass filter expressed by an equation sys_FIR=$(z^4+z^3+z^2+z^1)/(4 \times z^4)$ is used to filter the output control sequence.

The low-pass filter enables control output sequences (line 41, 42) to be easily generated from a control output sequence (line 40) of bang-bang control having high-frequency components reduced in different degrees. Thus, a control output sequence close to a control output sequence (line 40) of bang-bang control and enabling high-seed seek operation can be selected in such a range that there is no problem of remaining vibration in practice.

Figure 7:
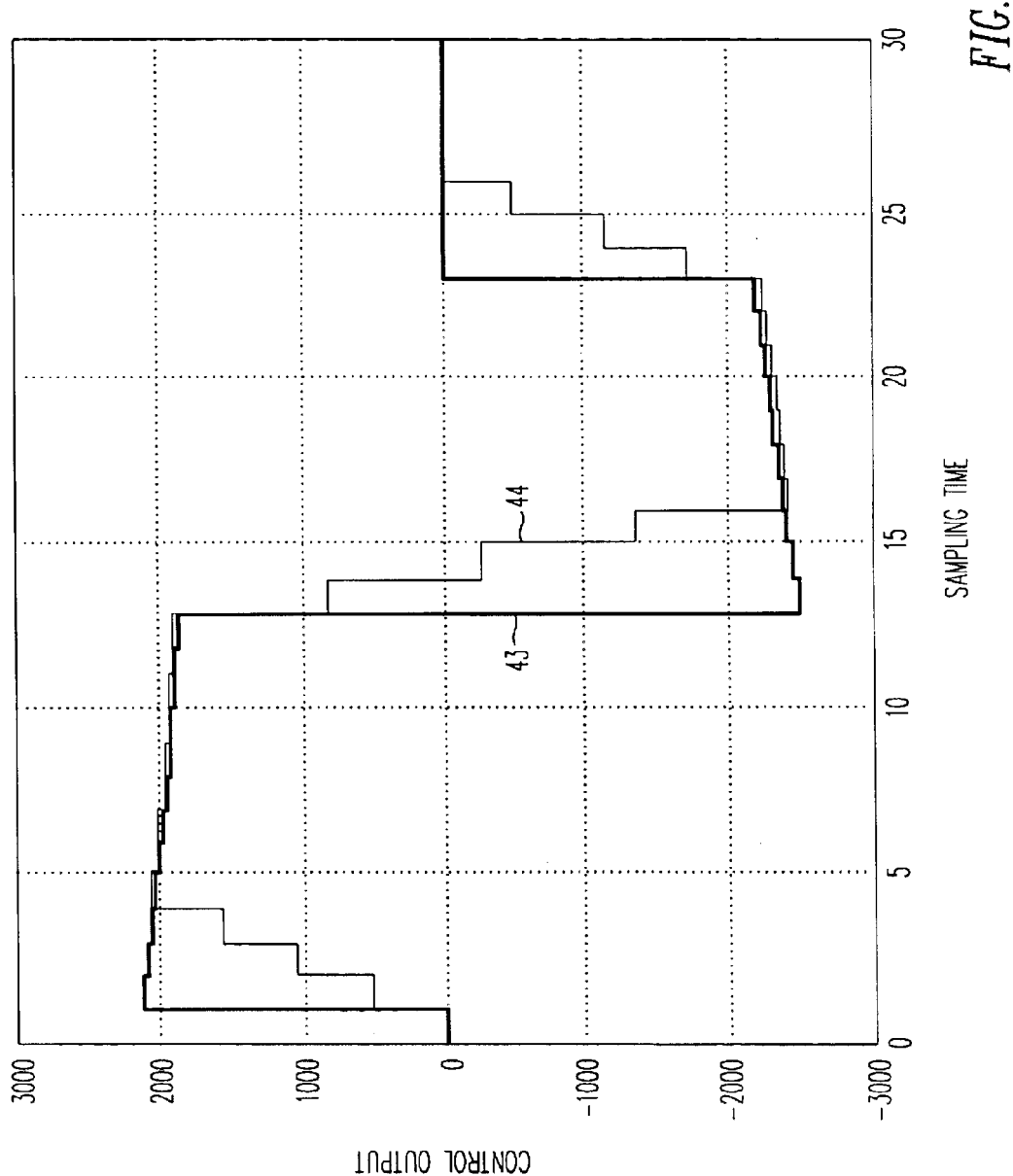
FIG. 7 is a graph showing an example of filtering of a control output sequence of bang-bang-control which has been modified so that the VCM current is not easily saturated, and which is filtered with a 4th-order filter to form a control output sequence in which high-frequency components are reduced.

A control output sequence of bang-bang control modified by considering counter electromotive force so that the VCM current is not easily saturated may alternatively be used. FIG. 7 shows an example of the result of filtering with a 4th-order filter a control output sequence of bang-bang-control modified so that the VCM current is not easily saturated, whereby a control output sequence in which high-frequency components are reduced is formed. A line 43 indicates a control output sequence of bang-bang-control modified in such a manner, and a line 44 indicates a control output sequence after filtering. A low-pass filter expressed by an equation sys_FIR=$(z^4+z^3+z^2+z^1)/(4 \times z^4)$ is used to filter the output control sequence. It is possible to fully use the capacity of the VCM power supply without saturation of VCM current by using the control output sequence formed as described above.

The control output sequence formed in this step maintains seek distance Y since it is passed through the filter having a DC gain of 1, and high-frequency components which can excite mechanical vibration can be reduced as desired by the low-pass filter. If the low-pass filter is an Nth-order finite impulse response (FIR) filter, a seek time can be represented by the time (sampling cycles) obtained as the sum of seek time T in bang-bang control and time N−1. Thus, it enables seek operation for a designated seek time and is therefore suitable for performing a just-in-time (JIT) seek. JIT seek is a seek method which takes relation latency into consideration reduces the seek speed during seek operation to reduce vibration and noise due to seek operation and to reduce power consumption while maintaining the desired performance.

The method of compensating a modeling error by using the thus-formed control output signal will be further described with reference to FIG. 4.

The feedback controller 25 produces a state where compensation is made only for a bias force, and where the feedback loop is open (step 33). That is, it sets the control system in a state for performing control system compensation process.

Figure 8A:
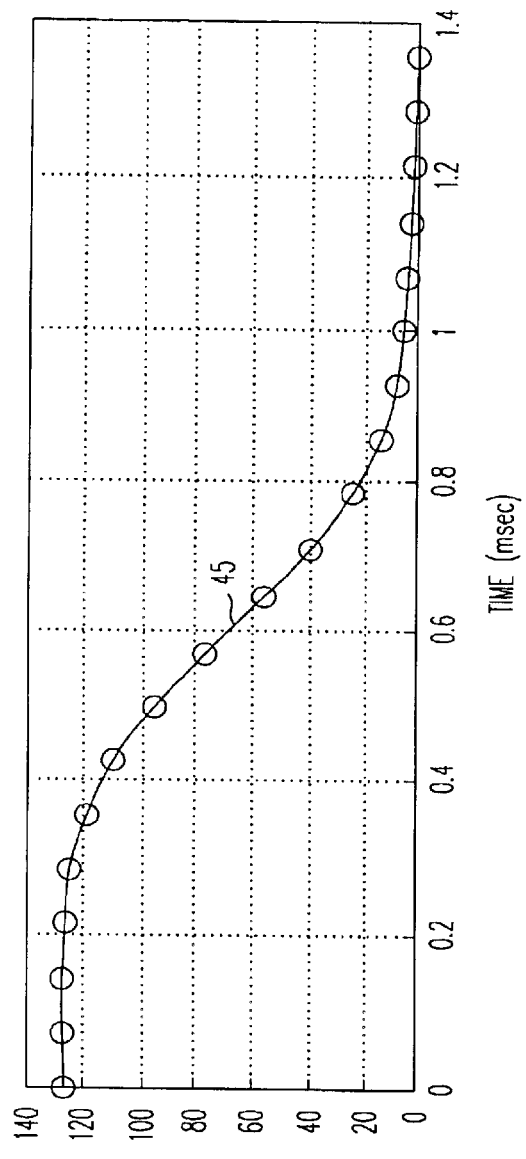
FIG. 8 comprises graphs showing an example of a seek through 127 tracks only by the feedforward control output.
Figure 8B:
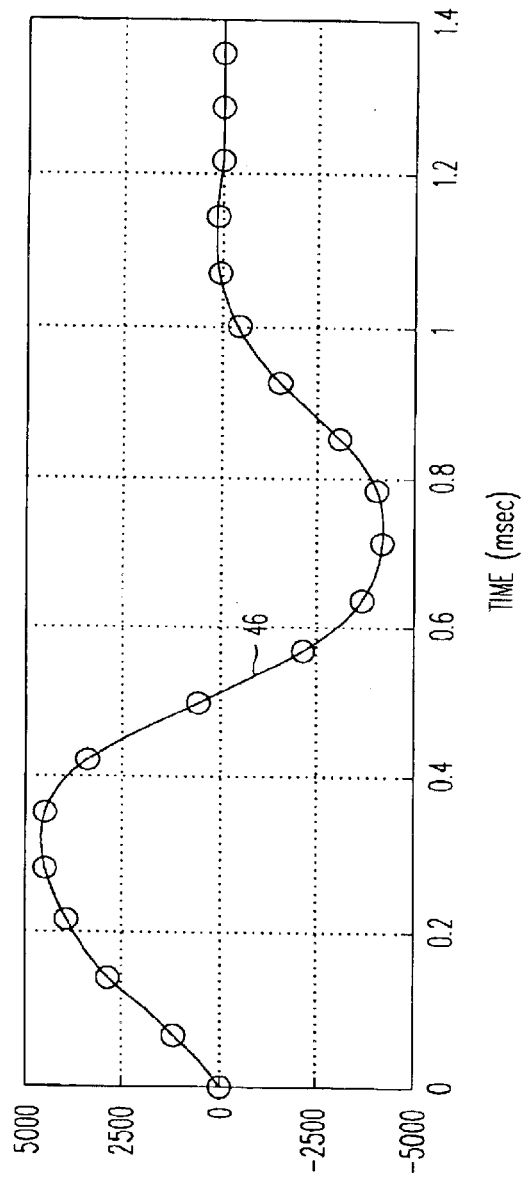

The control system is set in such a state and a seek operation is performed at a suitable seek distance by the produced feedforward control output (step 34). A head position signal y is thereby obtained (step 35). FIG. 8 comprises graphs showing an example of a seek through 127 tracks only by the feedforward control output. Graph (a) shows the position of the head versus time, that is, a head position trajectory and graph (b) shows the control output versus time.

A relating reference trajectory signal yr0 is then obtained (step 36). The original control model 22 is set as a rigid-body model since the control model in the hard disk unit is close to a rigid-body model. Reference trajectory signal yr0 is obtained by performing integration two times, as shown below.

$$vr0(k+1)=vr0(k)+Uff0(k);$$

$$yr0(k+1)=yr0(k)+vr0(k+1);$$

where k represents sampling time. A unit of the output Uff0 from the feedforward control signal generation means 21 is selected so that the result of second-order integration is a distance, and is converted into a VCM current value by the gain compensation means 24. The term vr0 is a unit of speed.

Next, identification of a compensation filter is performed (step 37). That is, a filter having reference trajectory signal yr0 as an input and head position signal y as its output is identified by a least square method or by using a system identification tool. A concrete example of a corresponding method is described in detail in "Theory of digital signal processing—3—estimation/adaptive signal processing" by Yahagi, Corona Publishing Co., Ltd. A filter can be identified as a low-order low-pass filter since in the hard disk drive, generally a control object is delayed in phase compared with a rigid-body model and the feedforward control output contains only a small amount of high-frequency components which cause large vibration of mechanical resonance.

Next, the filter obtained in step 37 is separated into a gain and a filter having a DC gain of 1 (step 38). The gain coefficient of the gain compensation means 24 is divided by the separated gain to adjust the gain of the feedforward control signal Uff0. Signal Uff is thereby obtained. The filter having a DC gain of 1 is set as compensation filter 23 in the control model (step 39). This compensation filter 23 enables the control model to include phase, which cannot be expressed by a simple original control model 22 such as a rigid-body model.

Figure 9:
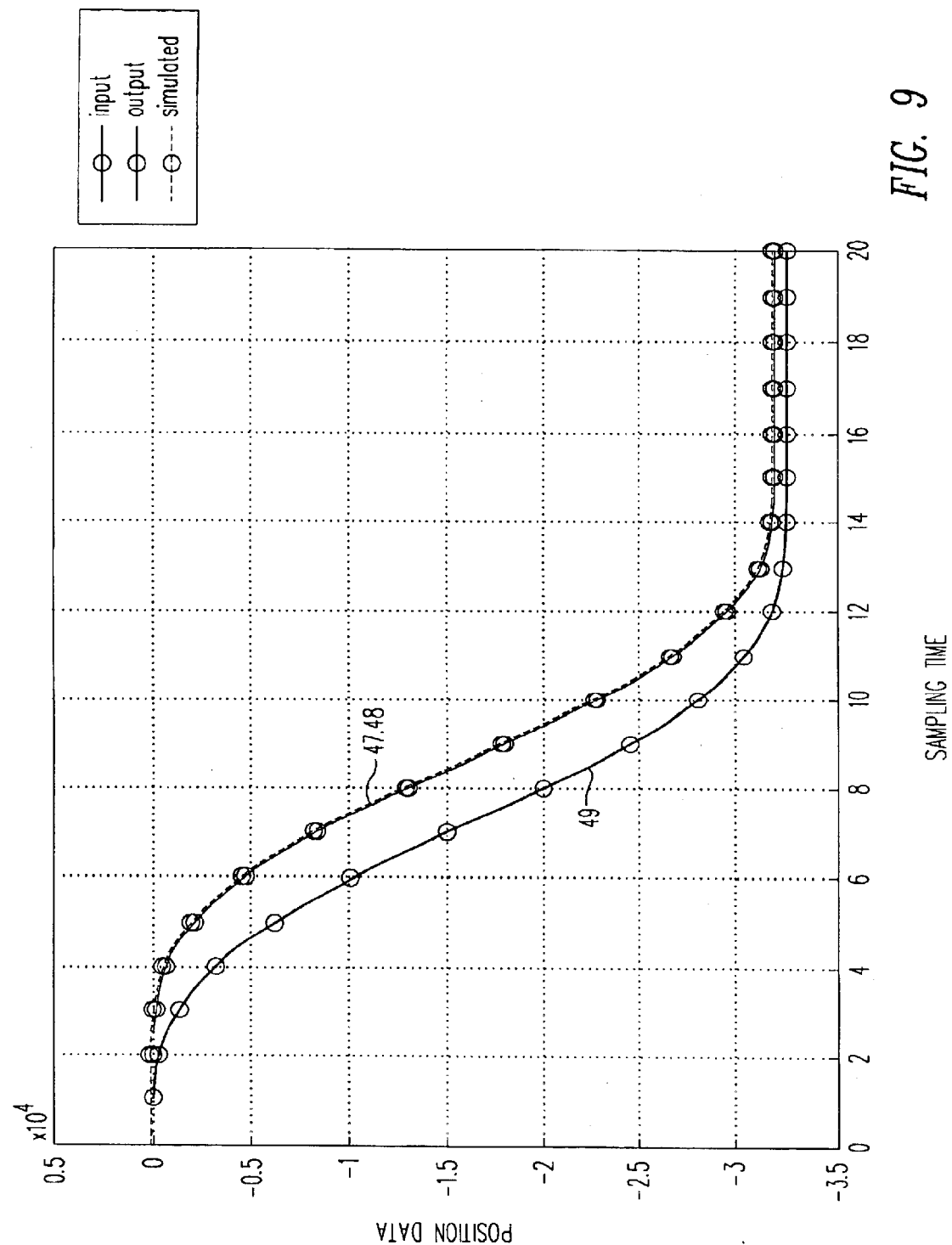
FIG. 9 is a diagram showing the head position before compensation of a control input, the head position after compensation, and simulation data versus sampling (control cycles)

FIG. 9 is a diagram showing the head position before compensation of a control input, the head position after compensation, and simulation data versus sampling (control cycles). Line 47 indicates the head position after compensation, line 48 indicates values representing the simulated position, and line 49 indicates data on the position before compensation. The head position after compensation and the simulation result coincide with each other generally correctly.

The filter yielding the results shown in FIG. 9 is a 2nd-order low-pass filter expressed as follows.

$$LPF=(-0.1107\ z^2+0.782\ z)/(z^2-0.5318\ z+0.2187)$$

Figure 10A:
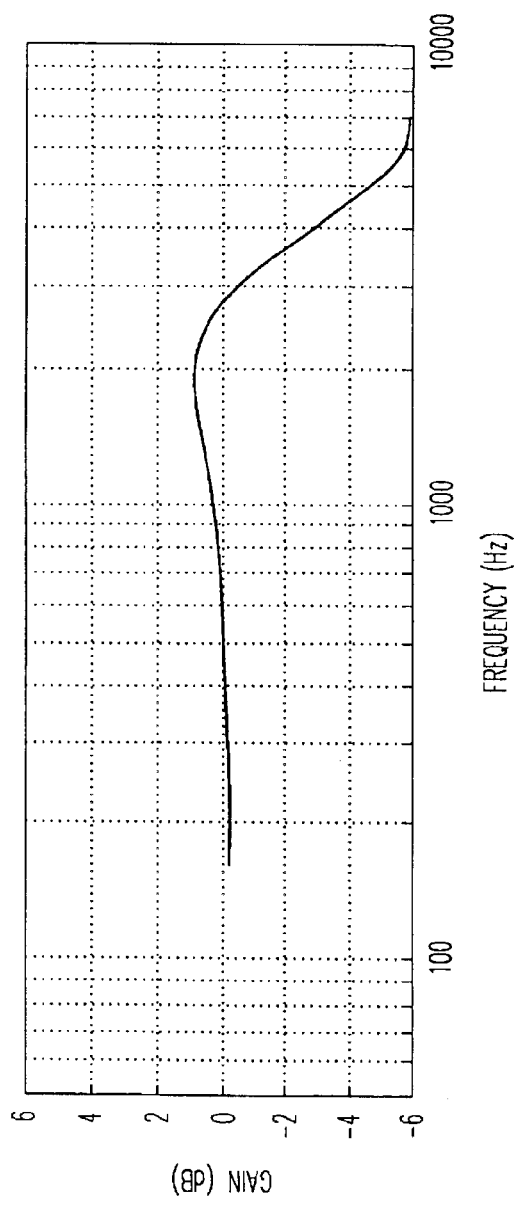
FIG. 10 is a Bode diagram of a filter obtained by compensation calculation in Embodiment 1.
Figure 10B:
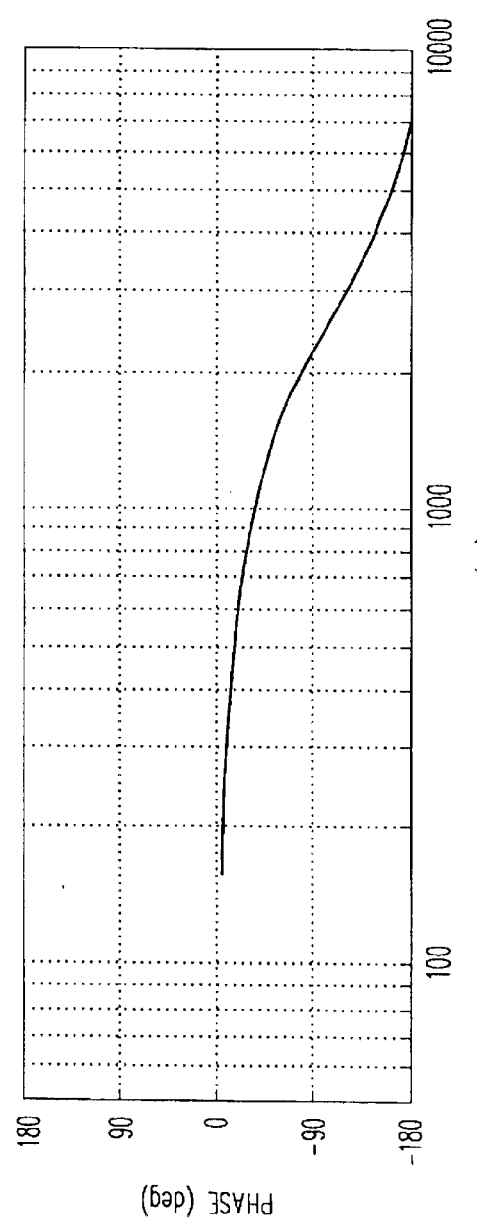

The sampling time is 0.07 msec. FIG. 10 shows a Bode diagram of this filter.
The filter portion of this filter having a DC gain of 1 is the compensation filter 23, and the remaining gain is used to compensate the value of the gain compensation means 24. That is, the gain value of the gain compensation means 24 is divided by the remaining gain.

Compensation process is thus performed. The above-described control method reduces a modeling error to achieve accurate head control. It is possible to achieve improved head control without an undershoot or an overshoot in ordinary head control by using the compensated control model.

Figure 11C:
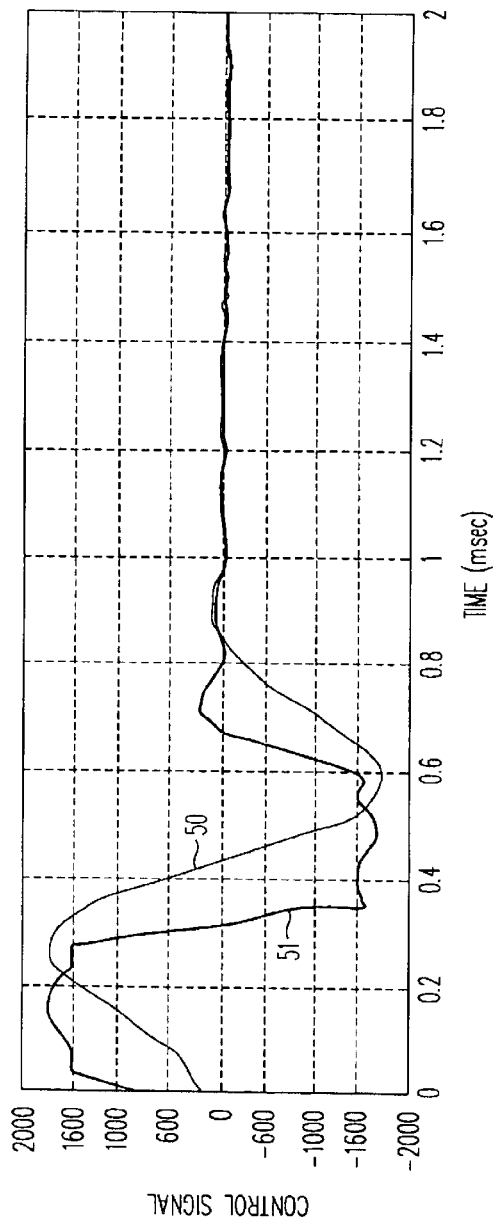
FIG. 11 is diagram showing an example of a seek operation through 64 tracks in Embodiment 1.
Figure 12A:
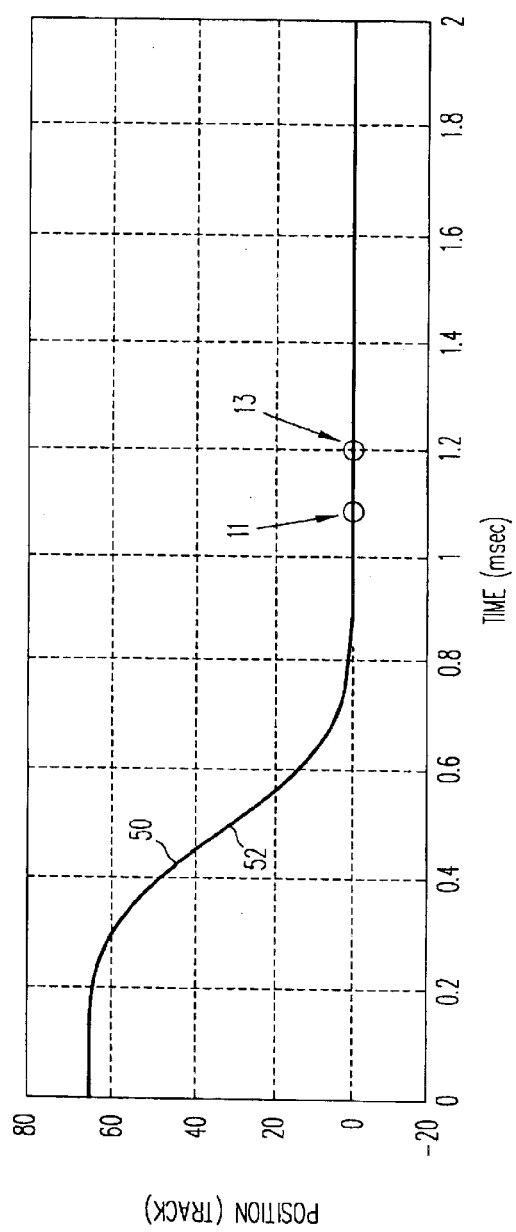
FIG. 12 is diagram showing an example of a seek operation through 64 tracks in Embodiment 1.

FIGS. 11 and 12 show an example of a seek operation through 64 tracks in accordance with this embodiment. In each of FIGS. 11 and 12, section (a) shows the head position versus time, section (b) is an enlarged diagram of a portion of section (a) showing settling, and section (c) shows the value of the control signal versus time. The control signal is the sum of the control outputs respectively obtained by feedforward and feedback. Line 50 indicates data from the control system of this embodiment, and line 51 indicates data obtained when a feedforward output close to that in bang-bang control, formed without reducing high-frequency components, was given. Line 52 indicates data obtained when a model inferior in phase characteristic accuracy to this embodiment was used.

According to the data (line 50) from the control system of this embodiment, as shown in FIGS. 11 and 12, the control output (control signal) from the system of this embodiment had no discontinuity. This is because the servo controller operates without a mode change such as a change from a seek mode (speed control) to a following mode (position control) during seek operation.

In the case where a feedforward output formed without reducing high-frequency components and close to that in bang-bang control was given (line 51), occurrence of remaining vibration resulted in a long seek completion time (t2), as indicated by line 51. In contrast, in the case of this embodiment, no such remaining vibration occurred and the seek completion time (t1) was shorter. In the case (line 52) where a model inferior in phase characteristic accuracy to this embodiment was used, an overshoot or an undershoot occurred, resulting in a long seek completion time (t3). In contrast, in the case of this embodiment, no such overshoot or undershoot occurred and the seek completion time (t1) was shorter.

In the disk unit, the gain of the VCM 4 varies depending on the position of the head, for example, inner, central and outer portions of the disk, or the gain of the VCM 4 is changed due to a change in temperature in an environment in which the disk unit is used. Variation in phase with the head position or temperature is smaller than that in gain. Under such a condition, therefore, only the VCM gain can be compensated by a method described below. However, the method described below can be used only after the phase and gain of the control model at a certain head position and a certain temperature have been compensated by identification and compensation of the control model in accordance with Embodiment 1.

The model-following control system can be expressed in a block diagram as shown in FIG. 13. Control output Ub of the feedback system can be shown by equation 1.

$$u_b(s) = C(s)(y_m(s) - y_p(2)$$
$$= C(s)(M(s)u_f(s) - P(s)(u_f(s) + u_b(s)))$$
$$= \frac{C(s)(M(s) - P(s))}{1 + C(s)P(s)} u_f(s)$$
$$= T(s) \frac{M(s) - P(s)}{P(s)} u_f(s)$$

where T(s) is the transfer function of the closed loop, shown by equation 2.

$$T(s) = \frac{C(s)P(s)}{1 + C(s)P(s)}$$

If Model M differs from Plant P only by a gain k, equation 3 is obtained.

$$M(s)=kP(s)$$

$$u_b(s)=T(s)(k-1)u_f(s)$$

$$=T(s)\Delta k u_f(s)$$

In actuality, $u_f(s)$ is a control signal output from the (feedforward) servo controller, which is close to a sine wave and may be regarded as a single-frequency component. Therefore it can easily be converted from the frequency domain to the time-base domain to $u_f(t)$ and feedback control signal $u_b(t)$ as shown by equation 4.

$$u_b(t)=T_0\Delta k u_f(t)$$

To make sure, it is assumed here that the control signal contains a DC offset due to a bias force. Then equation 4 is rewritten into equation 5.

$$u_b(t)=\Delta k_0 u_f(t)+u_0$$

where $\Delta k_0=T_0\Delta k$.

Then $\Delta k_0$ may be calculated by a least square method. That is, measured $u_b(t)$ ("$u_b(t)$" in the following denoting "measured $u_b(t)$") is considered to the sum of the linear function of $u_f(t)$ and a certain error e(t), as shown by equation 6.

$$u_b(t)=\Delta k_0 u_f(t)+u_0+e(t)$$

Therefore $\Delta k_0$ which minimizes Q shown by equation 7 may be calculated.

$$Q = \sum_{i=1}^{N} e(t)^2$$

To calculate $\Delta k_0$ which minimizes Q, the condition on which the differential of Q becomes zero may be obtained. The differential of Q is as shown by equations 8.

$$\frac{\partial Q}{\partial \Delta k_0} = -2\sum_{t=1}^{N}(u_b(t) - \Delta k_0 u_f(t) - u_0)u_f(t) = 0$$

-continued $$\frac{\partial Q}{\partial u_0} = -2\sum_{t=1}^{N}(u_b(t) - \Delta k_0 u_f(t) - u_0) = 0$$

Consequently, $\Delta k_0$ is calculated by equation 9.

$$\Delta k_0 = \frac{\sum_{t=1}^{N} u_b(t)u_f(t) - \sum_{t=1}^{N} u_b(t)\sum_{t=1}^{N} u_f(t)}{\sum_{t=1}^{N} u_f(t)^2 - \sum_{t=1}^{N} u_f(t)\sum_{t=1}^{N} u_f(t)}$$

That is, $u_f(t)$ and $u_b(t)$ may be multiplied together and cumulated, squared and cumulated, or simply cumulated throughout a seek, followed by division.

Further, assuming that the DC offset in the control signal has been removed ($u_0=0$), equation 9 can be simplified to form equation 10.

$$\Delta k_0 = \frac{\sum_{t=1}^{N} u_b(t)u_f(t)}{\sum_{t=1}^{N} u_f(t)^2}$$

As a result, gain k of the model can be expressed by equation 11.

$$k = 1 + \frac{1}{T_0}\frac{\sum_{t=1}^{N} u_b(t)u_f(t)}{\sum_{t=1}^{N} u_f(t)^2}$$

$T_0$ in this equation is the closed loop gain at the frequency of the control signal output during a seek. T0 may be assumed to be approximately equal to 1 without a problem of an error in the calculation result. That is, the error in the gain of the model may be obtained in such a manner that the squares of control signal $u_f$ are cumulated during a seek to obtain a denominator, the products of $u_f$ and $u_b$ are also cumulated to obtain a numerator, and division of them is executed at the end of the seek.

Figure 14:
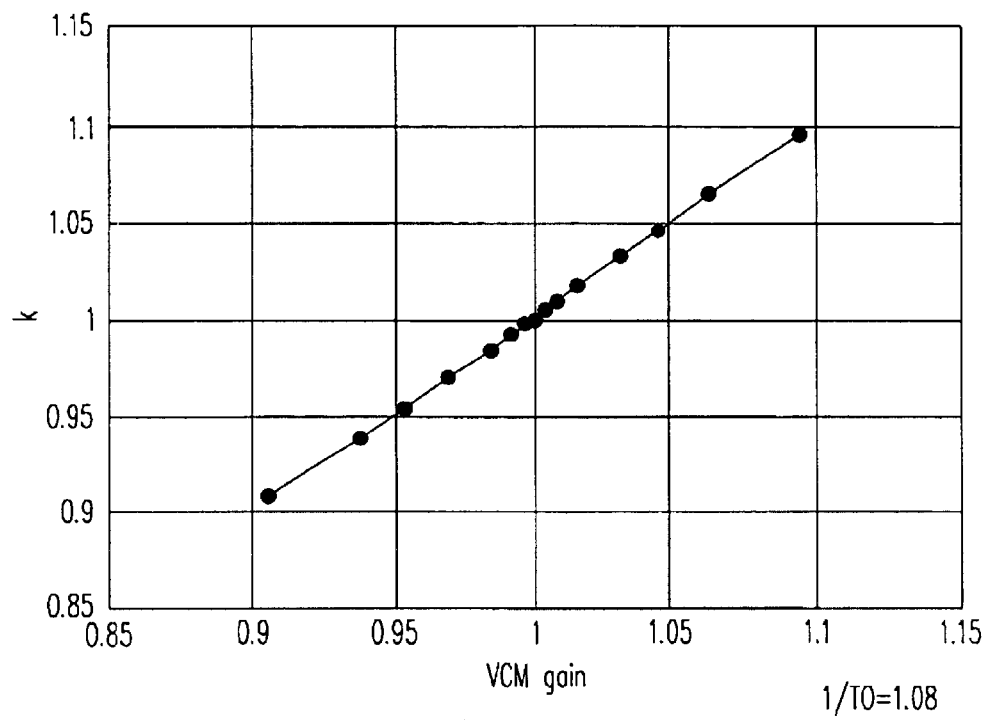
FIG. 14 is a graph showing an example of calculation of the value k during a seek through 64 tracks when only the gain of the VCM is changed.
Figure 15:
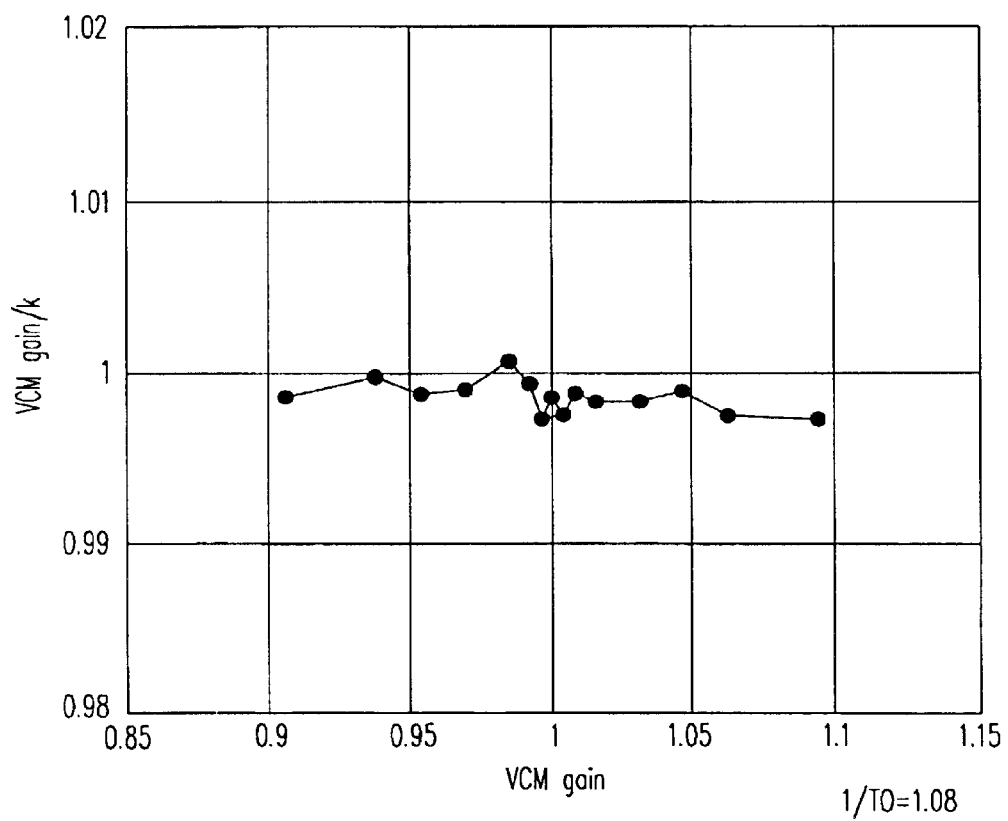
FIG. 15 is a graph showing a value obtained by dividing the VCM gain by the calculated value k (VCMgain/k)

FIG. 14 is a graph showing an example of calculation of the value k by using the above-described method during a seek through 64 tracks while changing only the gain of the VCM. FIG. 15 is a graph showing a value obtained by dividing the VCM gain by the calculated value k (VCMgain/k). However, the value of $1/T_0$ was determined such as to set VCMgain/k to 1.0 in a wide range.

As can be understood from FIGS. 14 and 15, the VCM gain can be compensated to a value within the range of 0.5% by the compensation method of this embodiment even when the VCM gain varies pulse or minus 10%.

The present invention has been described in detail with respect to the embodiments thereof. However, the present invention is not limited to the described embodiments, and various changes and modifications of the described embodiments can be made without departing from the scope of the invention.

For example, in Embodiment 1, when a control output sequence of bang-bang control is generated, it may be formed so as to attenuate smoothly at the time of deceleration. Such a control output sequence is filtered to make the VCM current smoother at the of settling, thereby further reducing mechanical vibration at the time of settling. FIG. 16 shows an example of this effect. Section (a) of FIG. 16 shows the control output sequence in Embodiment 1, and section (b) shows a control output sequence smoothly attenuating. The control signal is formed in such a manner that, at the last stage of deceleration, the speed is not directly reduced from 1 to 0 but gradually reduced as from "a" to a/4, and then to a/16. In the case where the speed is gradually reduced to ¼ each step, the value of "a" is 0.964. That is, from ¼+¼²¼³+ . . . =⅓, a×(9+⅓)=9 and, hence, a=0.964 is obtained.

The method of obtaining the values of Uff and yr by calculation has been described with respect to the embodiments by way of example. However, the values of Uff and yr may be obtained in advance and held in a table. Also, such a table may be stored and values selected from the table may be multiplied by the gain (a gain compensation coefficient and a seek distance or the like) to produce Uff and yr, thus reducing the amount of calculation. In a case where a table is used to reduce the amount of calculation, a method of using a sequence of head position signal y immediately or, after averaging, smoothing or the like, for a sequence of model reference track signal yr may be used instead of the method of reproduction by calculating a sequence of head position signal y using the control model (original control model 22 and compensation filter 23).

Also, digital filter 19 may be added for filtering of the control signal and the gain and phase characteristics of the filter may be adjusted to compensate an error between the control model (original control model 22 and compensation filter 23) of the above-described feedforward system and the actual control object 26. Further, the characteristics of the digital filter may be adjusted to simplify the compensation filter 23 in the above-described feedforward system, thereby reducing a modeling error over the entire range of seek length.

The advantages of the present invention relating to typical examples of the invention disclosed in this specification are as described below. That is, it is possible to reduce a modeling error inhering in a control model assumed in model following control, including gain and phase, to such a level as to ensure that the control system can operate with practically no problem relating to the error. It is possible to provide a technique for identifying and compensating a practical simple control model. Also, a high-speed step response characteristic can be obtained even if there is a limit to the maximum VCM current value. A feedforward signal which causes substantially no high-frequency mechanical vibration can be generated by a small amount of calculation. Further, it is possible to provide an HDD to which a practical control model, means for compensating the-model, and a feedforward signal are applied to reduce the seek time (a time period required to complete track following) or to improve a response characteristic.

We claim:

1. A rotary recording apparatus comprising:
 a rotary type recording medium on which information is recorded;
 a head for at least reading out information from said recording medium;
 a head drive for driving said head; a head position detector for outputting data on the current position of said head;
 a controller for controlling the position of said head relative to said recording medium;
 said controller including a feedforward control signal generator for outputting a feedforward control signal in response to input of a target position of said head, a control model which outputs reference position data in response to input of the feedforward control signal, and a feedback controller which outputs a feedback control signal in response to input of the reference position data and negative feedback data;

said controller controlling the position of said head to be in the target position by inputting the feedback control signal and the feedforward control signal to said head drive, by setting the negative feedback data to the current position data, and by inputting the difference between the reference position data and the negative feedback data to said feedback controller; and said control model being compensated so that, in a compensation process state in which compensation is made for an input to said feedback controller as a bias force, and in which the negative feedback is shut off, a sequence of the reference position data and a sequence of the current position data for each control cycle coincide with each other in response to input of the target position.

2. The rotary recording apparatus according to claim 1, wherein said controller further includes a gain compensation unit for compensating the gain of the feedforward control signal, the feedforward control signal gain-compensated by said gain compensation unit being input to said head drive;

said control model including an original control model and a compensation filter; said controller further including:
a unit for obtaining, for each control cycle, model position data outputted from said original control model in response to the target position input in the compensation process state;
a unit for obtaining, current position data for each control cycle outputted from said head position detector in response to the target position inputted in the compensation process state;
a unit for obtaining a filter to which a sequence of the model position data is input, and from which a sequence of the current position data is output;
a unit for separating said filter into a filter having a DC gain of 1 and a remaining gain; and
a unit for replacing a coefficient of said gain compensation unit with a value obtained by dividing the current coefficient by the remaining gain, and for replacing said compensation filter with said filter having a DC gain of 1.

3. The rotary recording apparatus according to claim 2, wherein said original control model outputs, in response to input of the feedforward control signal, a value obtained by second-order integration.

4. The rotary recording apparatus according to claim 2, further comprising a unit for recording, after execution of the compensation of said gain compensation unit or said compensation filter, the feedforward control signal gain-compensated for input of the target position, the reference trajectory data, and other kinds of data after the compensation process in a table, wherein, during ordinary seek operation, said head is controlled by reading out the data after the compensation process recorded in said table, or by performing calculation on the data after the compensation process.

5. The rotary recording apparatus according to claim 1, wherein said feedforward control signal generator includes a unit for generating a control signal sequence which provides maximum acceleration and maximum deceleration in said head in response to input of the target position, and a low-pass filter having a DC gain of 1, wherein the feedforward control signal is obtained by passing the control signal sequence through said low-pass filter.

6. The rotary recording apparatus according to claim 5, wherein the cutoff frequency of said low-pass filter is lower than a resonance frequency of said head drive.

7. The rotary recording apparatus according to claim 6, wherein said feedforward control signal generator further includes a control signal sequence converter for converting the control signal sequence in a state of decelerating said head so that the control signal sequence changes smoothly during its attenuation.

8. The rotary recording apparatus according to claim 1, wherein the gain of said control model is compensated according to a change in the gain of said head drive.

9. The rotary recording apparatus according to claim 8, further comprising:
a unit for determining the square of the feedforward control signal and the product of the feedforward control signal and the feedback control signal in each of control cycles during ordinary seek operation;
a unit for determining a cumulative value of each of the square and the product from the start to the end of the seek operation; and
a unit for dividing the cumulative value of the product by the cumulative value of the square, and for compensating the gain of said control model with the value obtained by said division.

10. The rotary recording apparatus according to claim 1, further comprising a digital filter to which the feedforward control signal and the feedback control signal are inputted, and from which a control signal is outputted to said head drive.

11. A method of controlling a rotary recording apparatus including a rotary type recording medium on which information is recorded, a head for at least reading out information from the recording medium; a head drive for driving the head, a head position detector for outputting data on the current position of the head, and a controller for controlling the position of the head relative to the recording medium, said controller including a feedforward control signal generator for outputting a feedforward control signal in response to input of a target position of the head, a control model which outputs reference position data in response to input of the feedforward control signal, and a feedback controller which outputs a feedback control signal in response to input of the reference position data and negative feedback data, said controller controlling the position of the head to be in the target position by inputting the feedback control signal and the feedforward control signal to the head drive, by setting the negative feedback data to the current position data, and by inputting the difference between the reference position data and the negative feedback data to the feedback controller, said method comprising the steps of:
setting the controller of the rotary recording apparatus in a compensation process state in which compensation is made for an input to the feedback controller as a bias force, and in which the negative feedback is shut off;
inputting the target position in the compensation process state to obtain the reference position data and the current position data for each control cycle; and
compensating the control model so that the sequence of the reference position data and the sequence of the current position coincide with each other.

12. The method of controlling a rotary recording apparatus according to claim 11, wherein said controller further includes a gain compensation unit for compensating the gain of the feedforward control signal, the feedforward control signal gain-compensated by the gain compensation unit being inputted to the head drive, the control model including an original control model and a compensation filter, said method further comprising the steps of:

inputting the target position in the compensation process state and obtaining, for each control cycle, model position data outputted from the original control model and the current position data;

obtaining a filter to which a sequence of the model position data is inputted, and from which a sequence of the current position data is outputted;

separating the filter into a filter having a DC gain of 1 and a remaining gain;

replacing a coefficient of the gain compensation unit with a value obtained by dividing the current coefficient by the remaining gain; and replacing the compensation filter with the filter having a DC gain of 1.

13. The method of controlling a rotary recording apparatus according to claim 12, wherein the original control model outputs, in response to input of the feedforward control signal, a value obtained by second-order integration.

14. The method of controlling a rotary recording apparatus according to claim 12, further comprising the steps of:

recording, in a table, the feedforward control signal, the reference trajectory data, and other kinds of data after the compensation process; and controlling the head during ordinary seek operation by reading out the data after the compensation process recorded in said table, or by performing calculation on the data after the compensation process.

15. The method of controlling a rotary recording apparatus according to claim 11, further comprising the steps of:

generating a control signal sequence which provides maximum acceleration and maximum deceleration in the head in response to input of the target position; and generating the feedforward control signal by passing the control signal sequence through and a low-pass filter having a DC gain of 1.

16. The method of controlling a rotary recording apparatus according to claim 15, wherein the cutoff frequency of the low-pass filter is lower than a resonance frequency of the head drive.

17. The method of controlling a rotary recording apparatus according to claim 16, further comprising the step of converting the control signal sequence in a state of decelerating the head so that the control signal sequence changes smoothly during its attenuation.

18. The method of controlling a rotary recording apparatus according to claim 11, further comprising the step of compensating the gain of the control model according to a change in the gain of the head drive.

19. The method of controlling a rotary recording apparatus according to claim 18, further comprising the steps of:

obtaining the square of the feedforward control signal and the product of the feedforward control signal and the feedback control signal in each of control cycles during ordinary seek operation;

obtaining a cumulative value of each of the square and the product from the start to the end of the seek operation; and dividing the cumulative value of the product by the cumulative value of the square, and for compensating the gain of the control model with the value obtained by the division.

\* \* \* \* \*

UNITED STATES PATENT AND TRADEMARK OFFICE
CERTIFICATE OF CORRECTION

PATENT NO. : 6,831,809 B2
APPLICATION NO. : 10/086204
DATED : December 14, 2004
INVENTOR(S) : Kagami et al.

It is certified that error appears in the above-identified patent and that said Letters Patent is hereby corrected as shown below:

Column 14, Line 55: " $Q = \sum_{i=1}^{N} e(t)^2$ " should read -- $Q = \sum_{t=1}^{N} e(t)^2$ --

Signed and Sealed this

Third Day of June, 2008

JON W. DUDAS
*Director of the United States Patent and Trademark Office*